(12) United States Patent
Beckman et al.

(10) Patent No.: US 11,722,591 B2
(45) Date of Patent: *Aug. 8, 2023

(54) SMARTPHONE CASE WITH SEPARATE COMPUTER HARDWARE FOR RECORDING PRIVATE HEALTH-RELATED DATA

(71) Applicant: MyMee Inc., New York, NY (US)

(72) Inventors: Christopher V. Beckman, Los Angeles, CA (US); Mette Dyhrberg, Brooklyn, NY (US)

(73) Assignee: Mymee Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,632

(22) Filed: May 5, 2021

(65) Prior Publication Data
US 2021/0258413 A1   Aug. 19, 2021

Related U.S. Application Data

(63) Continuation of application No. 16/664,514, filed on Oct. 25, 2019, now Pat. No. 11,032,406.

(51) Int. Cl.
| | | |
|---|---|---|
| *G06F 3/0488* | (2022.01) | |
| *G06F 3/044* | (2006.01) | |
| *G09G 5/00* | (2006.01) | |
| *H01H 9/00* | (2006.01) | |
| *H04M 1/02* | (2006.01) | |
| *H04M 1/18* | (2006.01) | |
| *G08B 6/00* | (2006.01) | |

(Continued)

(52) U.S. Cl.
CPC ........ *H04M 1/0281* (2013.01); *G06F 3/0412* (2013.01); *G06F 3/0488* (2013.01); *G08B 6/00* (2013.01); *H04M 1/0274* (2013.01); *H04M 1/185* (2013.01); *H04M 1/724092* (2022.02); *H04M 1/72412* (2021.01)

(58) Field of Classification Search
None
See application file for complete search history.

(56) References Cited

U.S. PATENT DOCUMENTS 8,243,225 B2 * 8/2012 Kai ................. G06F 3/0414
349/58
8,294,055 B2 * 10/2012 Kim ................. B29C 45/14811
200/600

(Continued)

*Primary Examiner* — Tuan A Tran

(57) ABSTRACT

New peripheral device cases and methods of use are provided. In some embodiments, specialized hardware for acquiring personal health data is provided within a smartphone case. In some such embodiments, a case with squeezable sections is provided, configured to monitor pressure applied by a user and record a user's grip strength. In some embodiments, optical sensors are provided which monitor and assess a user's behavior while extrapolating user statuses based on behavior. For example, a new form of transparent pixel array is provided over the screen of a smartphone held within a case, and records both visual data and user input related to the screen, while permitting normal actuation of the smartphone screen through the transparent pixel array. In some embodiments, data is secured and managed within separate computer hardware within a case, and shared with a smartphone held within it, and/or with a network, upon obtaining user consent.

20 Claims, 9 Drawing Sheets

(51) Int. Cl.
*G06F 3/041* (2006.01)
*H04M 1/72409* (2021.01)
*H04M 1/72412* (2021.01)

(56) References Cited

U.S. PATENT DOCUMENTS

| | | | | |
|---|---|---|---|---|
| 8,436,839 | B2* | 5/2013 | Takashima | G06F 3/0362 |
| | | | | 345/184 |
| 9,122,456 | B2* | 9/2015 | Kamin-Lyndgaard | ........................ |
| | | | | G06F 3/017 |
| 9,229,494 | B2* | 1/2016 | Rayner | F16M 13/022 |
| 9,256,291 | B2* | 2/2016 | Won | G06F 3/0412 |
| 9,285,840 | B2* | 3/2016 | Kamin-Lyndgaard | ........................ |
| | | | | G06F 3/04883 |
| 9,310,905 | B2* | 4/2016 | Luo | G06F 3/03547 |
| 9,518,890 | B2* | 12/2016 | Aotake | G08B 21/182 |
| 10,042,453 | B2* | 8/2018 | Cooke | G02B 26/02 |
| 10,725,595 | B2* | 7/2020 | Schooley | G06F 3/0412 |
| 2014/0200054 | A1* | 7/2014 | Fraden | H04M 1/72575 |
| | | | | 455/575.8 |
| 2014/0218305 | A1* | 8/2014 | Beasley | H04M 1/7253 |
| | | | | 345/169 |
| 2015/0103018 | A1* | 4/2015 | Kamin-Lyndgaard | ........................ |
| | | | | G06F 3/044 |
| | | | | 345/173 |
| 2018/0034496 | A1* | 2/2018 | Jacobsen | G06F 1/1656 |

\* cited by examiner

SMARTPHONE CASE WITH SEPARATE COMPUTER HARDWARE FOR RECORDING PRIVATE HEALTH-RELATED DATA

CROSS-REFERENCE TO RELATED APPLICATIONS

The present application is a continuation of U.S. utility patent application Ser. No. 16/664,514, titled "Smartphone Case with Separate Computer Hardware for Recording Private Health-Related Data," filed Oct. 25, 2019, which is incorporated by reference herein in its entirety.

TECHNICAL FIELD

This specification relates to peripheral devices for smartphones and other personal digital devices and, in particular, to cases for protecting and enhancing the function of personal digital devices.

BACKGROUND

Personal digital assistants ("PDAs") are small portable computers that allow a user to record and manage personal information, and they have been available in some form for decades. For example, as early as the 1970s, small digital wristwatches allowed users to perform personal computing, such as financial arithmetic, and were capable of storing information related to personal contacts, such as names, addresses and phone numbers. The now virtually ubiquitous smartphones can be thought of as modern PDAs, capable of sophisticated, highly secure communications over a network and execution of some of the most complex computer programs.

Today, specialized software products designed to be executed on smartphones is also widely available. Such software products, or "Apps", allow users to provide and receive a wide variety of data and to perform numerous functions based on such data. Some examples of Apps include those that provide functionality relating to online banking, digital gaming, and personal health management. With respect to health management, many Apps are currently available to aid users in managing their food intake and/or other health-relevant behavior.

With the rise of smartphones, a wide variety of protective cases have been developed. Many of these cases surround at least a significant portion of the smartphone. Some such cases also have aesthetic enhancements, such as decals and bright coloring.

SUMMARY

New smartphone and electronics peripheral device cases, systems and methods of use are disclosed herein. In some embodiments, specialized hardware for acquiring personal health data is provided within a smartphone peripheral device case. In some such embodiments, such a peripheral device case may include squeezable sections configured to monitor pressure applied by a user at different times. In some embodiments, a peripheral device case may also be configured to determine and record a user's grip strength according to the pressure received.

In some embodiments, optical sensors may be provided to monitor and assess a user's behavior, while extrapolating user statuses based on such behavior. For example, in some such embodiments, a new form of transparent pixel array may be provided over a screen of a smartphone held within the peripheral device case. In some embodiments, the transparent pixel array may record both visual data and user input related to the screen, while permitting normal actuation of the smartphone screen through the transparent pixel array.

In some embodiments, data may be securely held and managed with separate computer hardware and software disposed within a peripheral device case. Such data may then be shared with a smartphone held within the case and/or with a network, subject to certain conditions, in some embodiments. For example, in some embodiments, the computer hardware and software may request and receive user consent before sharing the securely held data.

As mentioned above, the disclosed embodiments may include methods and systems. In some embodiments, such systems include computer hardware and software, including non-transitory machine-readable media with executable instructions. When executed by computer hardware, the instructions may cause the systems to carry out any or all of the methods set forth in this application.

The details of one or more embodiments of the subject matter of this specification are set forth in the accompanying drawings and the description below. Other features, aspects, and advantages of the subject matter will become apparent from the description, the drawings, and the claims.

It should be noted that the figures referenced above are examples only of the wide variety of different embodiments falling within the scope of the invention, as will be readily apparent to those of ordinary skill in the art. Thus, any particular size(s), shape(s), proportion(s), scale(s), material(s) or number(s) of elements pictured are illustrative and demonstrative, and do not limit the scope of invention.

DETAILED DESCRIPTION

Figure 1:
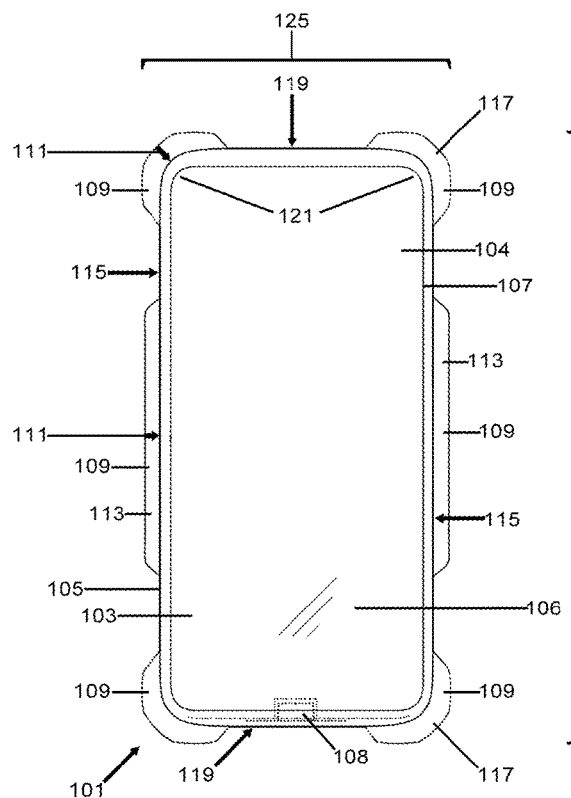
FIG. 1 is a front view of an example smartphone case peripheral device connected with, and holding, an example smartphone, in accordance with some embodiments.

FIG. 1 is a front view of an example smartphone case peripheral device 101, connected with and housing an example smartphone 103. In some embodiments, smartphone case peripheral device 101 includes a protective housing 105. The housing 105 may at least partially surround an outer surface 104 of a smartphone 103 when the smartphone 103 is disposed within the protective housing 105 of the smartphone case peripheral device 101. In some embodiments, smartphone case peripheral device 101 includes an internal smartphone-receiving section 107 for receiving and holding a smartphone. The smartphone-receiving section 107 may include an internal void with a shape complementary to, or configured to hold at least part of the outer surface 104 of smartphone 103. Thus, in such embodiments, a touchscreen 106 of the smartphone 103 may remain exposed. However, it will be appreciated that, in some alternative embodiments, a new form of touchscreen cover may also be included. Such a touchscreen cover may allow separate actuation by a user while allowing a user to view information on touchscreen 106. Such embodiments will be discussed in greater detail below, for example, in reference to FIG. 6.

Figure 3:
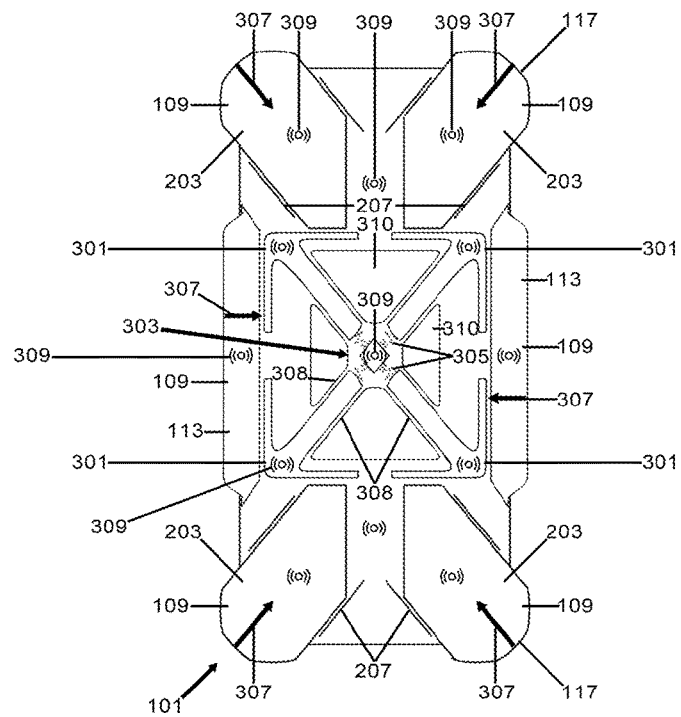
FIG. 3 is a back cross-sectional view of the smartphone case peripheral device shown in FIGS. 1-2, depicting several example internal aspects in accordance with some embodiments.

In some embodiments, smartphone case peripheral device 101 includes one or more sensors configured to monitor the physical abilities of a user. For example, as shown in FIG. 3, motion sensors may be provided in, on and/or about parts of smartphone case peripheral device 101. For example, in some embodiments, one or more of the motion sensors may be disposed on or near moving part(s) of smartphone case peripheral device 101 to monitor movements of those moving part(s). In some such embodiments, the motion sensors may comprise acceleration sensors. In some embodiments, such sensors may determine information relating to various movements, such as an acceleration at one or more times. Further examples of possible embodiments of such sensors are discussed in greater detail below.

In some embodiments, a control system with specialized programming may interpret such data and generate additional data relating to such movement(s) using a software program. In some embodiments, such a control system may be within smartphone case peripheral device 101 and may be separate from any control system held within a smartphone, such as smartphone 103, held within smartphone case peripheral device 101. In such embodiments, the control system within smartphone case peripheral device 101 is still connected and able to communicate with a smartphone held within smartphone case peripheral device 101, such as smartphone 103, via a communications connection.

In some embodiments, smartphone case peripheral device 101 may receive power (e.g., to power the operations of its separate control system) from smartphone 103 via a power connection. In some embodiments, a communications connection and a power connection may be a single physical communications and/or power connection, such as serial port and plug gateway 108. In some embodiments, the communications connection and/or the power connection may be a wired connection, such as a serial port and plug gateway 108, which includes a serial plug within smartphone case peripheral device 101 and a complementary serial port within smartphone 103. In some embodiments, the communications connection and/or the power connection may be a wireless connection, such as a Bluetooth, WIFI or other network connection. In some embodiments, multiple control systems associated with smartphone case peripheral device 101 (e.g., on board smartphone case peripheral device 101), smartphone 103 and/or elsewhere may carry out separate parts of a software program, in accordance with aspects of the present invention. In other embodiments, a single control system, (e.g., on board smartphone case peripheral device 101, or on board smartphone 103, or bridging between smartphone case peripheral device 101 and smartphone 103) may carry out steps of a software program. Examples of specific software programs, process steps, and such control systems carrying out aspects of the invention are discussed in greater detail below.

In some embodiments, acceleration curves, plotting accelerations over time may be created by such a control system. In some embodiments, the behavior and/or capabilities of a user, and aspects thereof, may be deduced by such a control system. In some embodiments, a user's physical strength at particular times may be determined by the degree of movement of a moving part, for example, when such a moving part is force-loaded. In such embodiments, the moving part may be connected to a spring to resist movement and a degree of movement of such moving part may correspond with a force applied to each such moving part or a part of such a moving part, and, therefore, a strength level of a user, which is recorded by such a control system.

As another example, in some embodiments, a user's flexibility at particular times may be determined by the degree of movement of such a moving part. As another example, a user's range of movement at particular times may be determined by the degree of movement of such a moving part. As another example, a user's state and degree of inflammation may be determined by the speed and/or degree of movement of such a moving part. As another example, a user's alertness may be determined by the speed and/or degree of movement of such a moving part. As another example, a user's reflexes may be determined by the speed of movement of such a moving part. As another example, a user's muscular control may be determined by the speed of movement of such a moving part. As another example, a user's muscular movement speed may be determined by the speed of movement of such a moving part. As another example, a user's hand-eye coordination may be determined by the speed and accuracy of movement of such a moving part, in response to a command produced by such a control system.

As a structural example, in some embodiments, such moving part(s) are one or more compressible member(s), such as example compressible members 109. Compressible members 109 each are part of, and connected to the remainder of, smartphone case peripheral device 101, and can be moved inward, via inward pressure against their outward-facing surfaces, in some embodiments. Given enough such inward pressure against it, such a compressible member may begin to move inward relative to the remainder of smartphone case peripheral device 101, in some embodiments, as shown by example force and movement arrows 111. In some embodiments, as will be discussed in greater detail below, a wide variety of different forms of force-biasing may be provided, in opposition to, and to provide resistance against, such movements. For example, instead of, or in addition to, being connected to springs, compressible members 109 may be subjected to electrostatic or magnetic forces, in some embodiments. For example, in some such embodiments, any or each of compressible members 109 may include a charge or dipole, driven by an opposing charge or dipole nearby and within the remainder of smartphone case peripheral device 101. In some such embodiments, the charge or dipole nearby and within the remainder of smartphone case peripheral device 101 may be alterable by the control system. In some embodiments, a plurality of different devices and forms of force-biasing may each be used to create counterforce and resistance to movement in the compressible members. For example, as will be discussed in greater detail below, in some embodiments, a combination of spring-created and normal (i.e., structural) forces may be applied to one or more of the compressible members. In some such embodiments, the different devices and/or force types may create a more rapidly escalating counterforce and resistance to movement in the compressible members, while still enabling continued compression of the members. In some such embodiments, a greater escalation in such counterforce and resistance is created at particular thresholds of compression of the compressible members. In some embodiments, any such force bias may be reversed or otherwise altered, at particular times, and to accommodate particular uses and situations. Such embodiments will be discussed in greater detail below.

Compressible members 109 may exist in a wide variety of possible numbers, physical arrangements, and specialized forms, in various embodiments of the invention. For example, in some embodiments, some such compressible members 109 may be in the form of user-compressible handgrips, such as example external compressible handgrips 113, shown at the outer lengthwise sides 115. In some embodiments, a peripheral device that is not a smartphone case, but contains hand-compressible members and a control system, as set forth herein, may be provided, instead of or in addition to smartphone case peripheral device 101. In some such embodiments, such compressible members may have a larger range of movement, allowing for a better range of measurements. In some embodiments, compressible members of smartphone case peripheral device 101 may be in the form of case- and smartphone-protecting bumpers, such as compressible bumpers 117, which may protect smartphone case peripheral device 101 (and smartphone 103 within it) from collisions along both lengthwise sides 115 and at side-ends 119—compressible bumpers 117 being disposed at, and extending from, the corners, such as the example corners 121, of smartphone case peripheral device 101 as pictured. In some embodiments, compressible bumpers 117 may have a curved, more complex outer profile than that pictured for compressible handgrips 113 to accommodate compression from a wider variety of environmental insults.

As will be explained in greater detail below, the compression of any of compressible bumpers 117 may be directed in a different inward direction(s) than that of other compressible bumpers 117 or other compressible members 109, such as compressible handgrips 113, in some embodiments. Of course, in practice, a wide variety of additional and/or alternative forms and different compression directions (even out-of-plane with one another) may be created in different embodiments of the invention. The exact number, disposition, arrangement, form and direction of compression provided for compressible members 109 herein are only examples of the myriad alternative and additional embodiments falling within the scope of the invention, as will be readily apparent to those of ordinary skill in the art to which the present invention relates.

Similarly, as will be apparent to those of ordinary skill in the art to which the present invention relates, smartphone case peripheral device 101 may generally be formed in a wide variety of alternative shapes, sizes, and dimensions in different embodiments of the invention. For example, in some embodiments, smartphone case peripheral device 101 may have a shorter length relative to its width than that pictured as example device length 123 and example device width 125, to accommodate a smartphone with different dimensions than that pictured as smartphone 103. In some embodiments, a variety of different-sized smartphones and/or PDAs may be held within, control and/or be controlled by smartphone case peripheral device 101. In some such embodiments, a smartphone-gripping bracket or other adjustable form factor may adjust to match and grip such different-sized smartphones and/or PDAs, or multiples of them.

Similarly, for example, although a particular physical communications and/or power connection 108 is shown in the figure, it should be understood that a wide variety of different physical communications connections and/or power connections may additionally or alternatively be used for communications and/or power connections.

Figure 2:
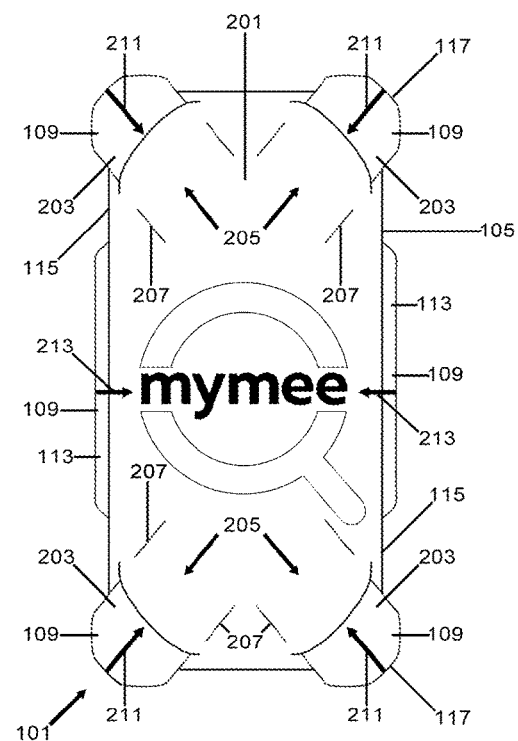
FIG. 2 is a back view of the example smartphone case peripheral device shown in FIG. 1 depicting additional example aspects in accordance with some embodiments.

FIG. 2 is a back view of the same example smartphone case peripheral device 101, discussed above, depicting additional example aspects in accordance with embodiments of the invention. From the rear perspective, only the rear side 201 of smartphone case peripheral device 101 is visible, meaning that smartphone 103, if present within smartphone case peripheral device 101, is covered from view. However, it should be understood that smartphone 103 may still be held within an internal smartphone-receiving section of smartphone case peripheral device 101, as depicted above in FIG. 1. Also visible from the rear perspective are some parts of example force transmission struts 203, attached to, or integral with, some of example compressible members 109—namely, example compressible bumpers 117. As will be discussed below, in a cross-sectional view exposing more example inner workings of example smartphone case peripheral device 101, other forms of struts and other moving and structural pieces and complexes thereof may be included, in addition to and/or instead of force transmission struts 203, in some embodiments.

In certain embodiments, to accommodate force transmission struts 203 while channeling their movement in particular direction(s), strut-holding channels 205 may be included, for example, within the rear side 201 of smartphone case peripheral device 101. Such strut-holding channels 205 may include movement guides, such as channel walls 207, which may allow the linear movement of force transmission struts 203 and, thereby, the compression of compressible members 109, as shown by example force and movement arrows 211

(and their return, extending outward, in the opposite direction than that pictured by force and movement arrows 211). As mentioned above, and as will be discussed in greater detail below, such linear movements may be influenced by force-biasing, such as by attached springs, actuators, or other materials.

Similarly, compressible handgrips 113 are also compressible, being partially exposed and extending beyond the edge of outer lengthwise sides 115 in their resting state, in some embodiments. As such, compressible handgrips 113 may be accessible and hand-actuable by a user, who can demonstrate and record her or his grip strength by compressing compressible handgrips 113 toward one another, as shown by example force and movement arrows 213 in accordance with embodiments of the invention discussed in greater detail elsewhere in this application. And, also similarly to other compressible members 109, compressible handgrips 113 may be attached to, or integral with, force transmission struts (not pictured) within protective housing 105 of smartphone case peripheral device 101, and subject to return to their starting position (as pictured) by force-biasing, in accordance with some embodiments discussed in greater detail below.

FIG. 3 is a back cross-sectional view of the same example smartphone case peripheral device 101, discussed above, depicting several example internal aspects, in accordance with embodiments of the invention. As mentioned above, according to some embodiments of the invention, several additional internal struts now appear, in addition to force transmission struts 203 (which, themselves, can now be viewed more completely). For example, intermediate, multipurpose force transmission struts 301 within smartphone case peripheral device 101 now appear, which are able to transmit movements and forces from any of compressible members 109 to a central shock absorber 303, in accordance with some such embodiments. In some embodiments, central shock absorber 303 includes force-biasing device(s), such as example mechanical springs 305. Thus, for example, in some embodiments, a user may press any of example compressible members 109 inward (i.e., compressing them), as shown by example force and movement arrows 307, and, in turn, such example compressible members 109 (and any struts integral with or attached thereto, such as example force transmission struts 203) may then collide with intermediate, multipurpose force transmission struts 301, which, in turn, may likewise travel inwards, compressing mechanical springs 305 of central shock absorber 303.

To guide their motion inwards, as similarly discussed with respect to channels created by channel walls 207, intermediate multipurpose force transmission struts 301 may also be guided in linear movement, in some embodiments, by internal channel guides, such as the examples pictured as channel walls 308. In some embodiments, internal channel guides such as channel walls 308 may be formed by elastomeric, or pliant blocks, such as the example pliant blocks 310, which, themselves, create auxiliary resistance and force-biasing against at least some compression of at least some of compressible members 109. As mentioned above, in certain embodiments, some of such auxiliary resistance may be greater than that caused by mechanical springs 305 alone and applied only at greater degrees of compression of compressible members 109. Thus, a rapidly escalating resistance to compression of compressible members 109 can be achieved, yielding a wide range of testable compression forces and, ipso facto, user's hand strengths and other capabilities, in accordance with some embodiments of the invention.

Because each of intermediate multipurpose force transmission struts 301 may be driven inward by more than one of compressible members 109 (and struts integral with or attached thereto), the intermediate, multipurpose force transmission struts 301 may support more than one type of function in some embodiments of the invention. For example, in some such embodiments, intermediate, multipurpose force transmission struts 301 can receive compression forces from (1) force transmission struts 203 attached to and/or integral with compressible bumpers 117; and/or (2) compressible handgrips 113. In some such embodiments, a user may thus compress central shock absorber 303 by compressing compressible bumpers 117 and/or compressible handgrips 113. Thus, in certain embodiments discussed further below, a user may test her or his hand grip strength using compressible handgrips 113 and may also protect a smartphone held within smartphone case peripheral device 101 using central shock absorber 303. As mentioned above, the recitation of an example central shock absorber is an illustration of some, but not all, embodiments of the invention, and a wide variety of alternative structures, numbers, arrangements, force-biasing and movement resistance technologies may be used, in addition to, or as an alternative to, the design pictured for central shock absorber 303, in various embodiments of the invention. For example, in some embodiments, multiple shock absorbers may be used, rather than a single shock absorber. As another example, in some embodiments, another form of force biasing, such as electrostatic, magnetic, weights, or friction, may be used as a shock absorber, instead of or in addition to springs.

As mentioned above, in some embodiments, the degree of compression of any of compressible members 109 may be sensed and recorded by a control system within, or in communication with, smartphone case peripheral device 101. In some such embodiments, such a degree of compression may be related to an amount of force applied (e.g., to such compressible member(s)) to achieve such a degree of compression. In some such embodiments, such an amount of force may also, or alternatively, be recorded. In some such embodiments, additional data may be recorded, such as the time of day that the force is applied, and the identity of the user compressing the compressible member(s).

To record degrees of compression, sensors (e.g., motion sensors) may be included within, on, and/or about smartphone case peripheral device 101. As shown, a strategic array of such motion sensors, such as those including example sensors 309, may be provided, wherein each such motion sensor is situated to observe a degree of movement of each of compressible members 109 or a force-transmission strut attached to, or driven by, such a compressible member.

Thus, for example, in some methods of use in accordance with embodiments of the invention, a user may squeeze smartphone case peripheral device 101 by compressing one or both of example compressible handgrips 113 to various degrees, with escalating resistance, due to force loading within shock absorber 303 (such as example internal springs 305). Because the motion sensors including example motion sensors 309 may monitor the degree, speed and/or acceleration of movement of example external compressible handgrips 113, the amount of force applied by a user's hand to compress smartphone case peripheral device 101 can be determined by a control system connected for communications with motion sensors 301. For example, in some embodiments, the amounts of force so determined as required to compress each of compressible handgrips 113 may be summed to determine a total amount of compression force applied by the user. In some embodiments, multiple sensors may be provided for separately tracking multiple parts of each of compressible members 109 or struts attached to and/or integral with them. In some such embodiments, more complex characteristics of actuation of compressible members 109, rather than merely a compression force, or amount of compression force, or total compression force, may be determined and recorded by such sensors and a control system controlling the function of, and receiving input from, smartphone case peripheral device 101. For example, in some embodiments, an order or pattern of actuation of such parts of compressible members 109. In some such embodiments, a user's dexterity level (e.g., a degree of compliance with actuation instructions) may be determined and recorded at particular times. As mentioned above, and as another example, in some embodiments, a level of inflammation of a user may be assessed, based on differences in strength and/or speed of movements recorded at particular times. For example, in some such embodiments, a user with an auto-immune disorder or disease may record such data to assess that user's disorder or disease state. As another example, in some such embodiments, a user with a cardiovascular disease may record such data to assess that user's disease state. As another example, in some embodiments, a user's accuracy and/or precision in actuation of compressible members 109 and parts thereof may be assessed and recorded by such a control system, which may be provided within, or may be in communication with, computer hardware within smartphone case peripheral device 101 in different embodiments of the invention. For example, in some embodiments, a level of physical ability, cognition, accuracy, and/or precision of a user may be assessed and recorded based on a user's recorded strength. Some example embodiments of such a control system are discussed in greater detail immediately below, in reference to FIG. 4.

Figure 4:
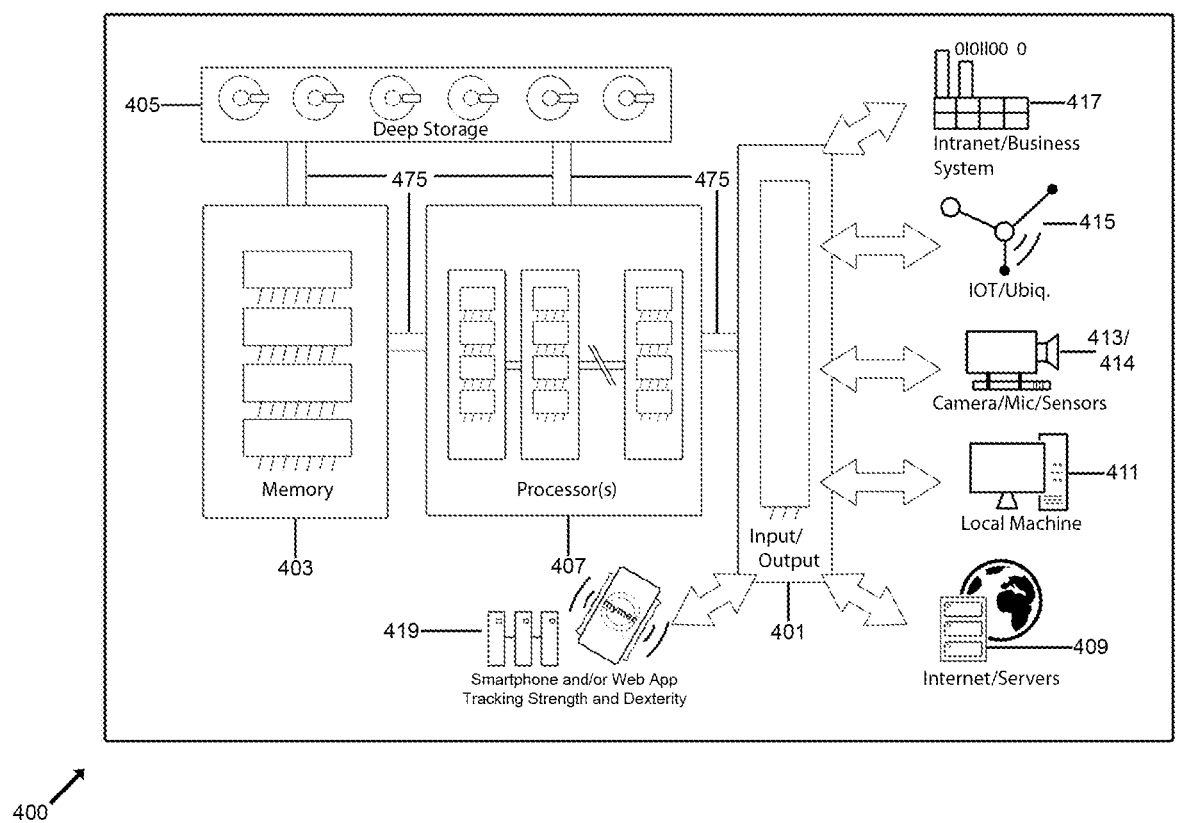
FIG. 4 is a schematic block diagram of an example control system that may be used to implement various aspects of the disclosed embodiments, further described in reference to FIGS. 1-3 and 5-13.

FIG. 4 is a schematic block diagram of some example elements of an example control system 400, preferably incorporating a non-transitory machine-readable medium, that may be used to implement various aspects of the present invention, some of which are described in reference to FIGS. 1-3, above, and FIGS. 5-13, below. The generic and other components and aspects described herein are not exhaustive of the many different control systems and variations, including a number of possible hardware aspects and machine-readable media, that might be used, in accordance with embodiments of the invention. Rather, the control system 400 is described herein to make clear how aspects may be implemented.

Among other components, the control system 400 may include an input/output device 401, a memory device 403, a longer-term, deep data storage media and/or other data storage device 405, and one or more processors 407. The processor(s) 407 is (are) capable of receiving, interpreting, processing and manipulating signals and executing instructions for further processing and for output, pre-output and/or storage in and outside of the control system. The processor(s) 407 may be general or multipurpose, single- or multi-threaded, and may have a single core or several processor cores, including microprocessors. Among other things, the processor(s) 407 is (are) capable of processing signals and instructions for the input/output ("I/O") device 401, to cause a user interface to be provided or modified for use by a user on hardware, such as, but not limited to, a personal computer monitor or terminal monitor with a mouse and keyboard and presentation and input-facilitating software (as in a GUI), or other suitable GUI presentation system (e.g., on a smartphone touchscreen, a smartphone case peripheral device screen, and/or with other ancillary user input hardware, such as compressible members with motion sensors, as discussed elsewhere in this application).

For example, in some embodiments, sensor(s) and other user interface aspects may gather input from a user and present user(s) with selectable options, such as preconfigured commands, to interact with hardware and software of the control system and monitor a user's strength, dexterity and other capabilities and behaviors at particular times. For example, in some such embodiments, a user may interact with the control system through any of the actuation and user interface techniques set forth in this application, such as by compressing compressible members and causing the control system to record degrees and forces of compression, dexterity, or other biomarkers, or to carry out any other actions set forth in this application for a control system. The processor(s) 407 is/are capable of processing instructions stored in memory devices 405 and/or 403 (or ROM or RAM) and may communicate via system buses 475. I/O device 401 is capable of input/output operations for the control system 400, and may include and communicate through innumerable input and/or output hardware, and innumerable instances thereof, such as a computer mouse(s), or other sensors, actuator(s), communications antenna, keyboard(s), smartphone(s) and/or PDA(s), networked or connected additional computer(s), camera(s) or microphone(s), mixing board(s), reel-to-reel tape recorder(s), external hard disk recorder(s), additional movie and/or sound editing system(s) or gear, speaker(s), external filter(s), amp(s), preamp(s), equalizer(s), filtering device(s), stylus(es), gesture recognition hardware, speech recognition hardware, computer display screen(s), touchscreen(s), sensors overlaid onto touchscreens, or other manually actuable member(s) and sensor(s) related thereto. Such a display device or unit and other input/output devices could implement a program or user interface created by machine-readable means such as software, permitting the system and user to carry out the user settings and other input discussed in this application. I/O device 401, memory 403, deep storage media device 405, and processor(s) 407 are connected with and able to send and receive communications, transmissions and instructions via system bus(es) 475. Deep storage media device 405 is capable of providing mass storage for the system, and may be a computer-readable medium, a connected mass storage device (e.g., flash drive or other drive connected to a U.S.B. port or Wi-Fi), may use back-end or cloud storage over a network (e.g., the Internet) as either a memory backup for an internal mass storage device or as a primary memory storage means, or may simply be an internal mass storage device, such as a computer hard drive or optical drive.

Generally speaking, the system 400 may be implemented as a client/server arrangement, where features of the invention are performed on a remote server, networked to the client, and made a client and server by software on both the client computer and server computer. System 400 is capable of accepting input from any of those devices and systems 409-419 (e.g., Internet/servers 409, local machine 411, camera/microphone/sensors 413-414, IOT/Ubiq. 415, Intranet/business system 417, and smartphone and/or web app 419) and modifying stored data within them and within itself, based on any input or output sent through input/output device 401.

Input and output devices may deliver their input and receive output by any known means, including, but not limited to, any of the hardware and/or software examples shown as 409-419.

While the illustrated example system 400 may be helpful to understand the implementation of aspects of the invention, any suitable form of computer system known in the art may be used—for example, a simpler computer system containing just a processor for executing instructions from a memory or transmission source—in various embodiments of the invention. The aspects or features set forth may be implemented with, and in any combination of, digital electronic circuitry, hardware, software, firmware, modules, languages, approaches or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. Any or all of the method steps of the embodiments of the present invention may be performed by such a programmable processor, executing a program of instructions, operating on input and output, and generating output and stored data. A computer program includes instructions for a computer to carry out a particular activity to bring about a particular result and may be written in any programming language, including compiled and uncompiled and interpreted languages and machine language, and can be deployed in any form, including a complete program, module, component, subroutine, or other suitable routine for a computer program.

Figure 5:
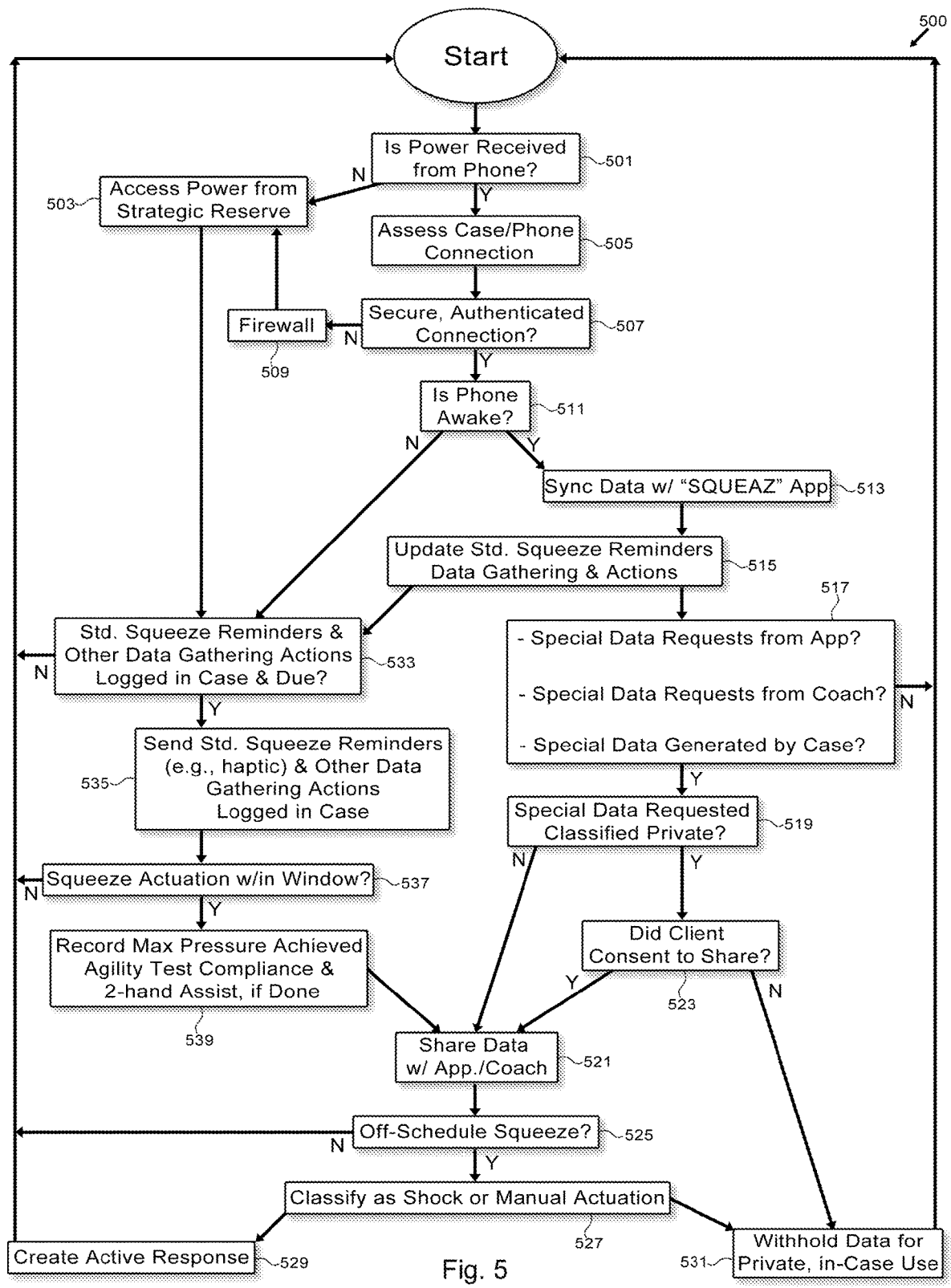
FIG. 5 is a process flow diagram, setting forth exemplary processing steps that may be undertaken by a control system (such as the exemplary control system set shown in FIG. 4) according to some embodiments.

FIG. 5 is a process flow diagram, setting forth several example steps 500 that may be undertaken by a control system (such as the example control system set forth above, in reference to FIG. 4) implementing some example aspects of the present invention (e.g., through software executed on any of the control system hardware described throughout this application), according to some embodiments of the invention. In some embodiments, as discussed above, such a control system is included within a new form of smartphone case peripheral device, which may communicate with, control, and be controlled by, a separate control system(s) resident on such a smartphone or a network with which the smartphone and/or the smartphone case peripheral device is connected (or variably connected), in accordance with some embodiments of the invention discussed in this application.

Beginning with step 501, the control system of the smartphone case peripheral device (such as example smartphone case peripheral device 101, discussed above) first determines whether power is being provided by a smartphone with which the control system has connection(s) (such as example smartphone 103). As discussed above, such connection(s) may be connection(s) for transmitting and receiving power, in some embodiments. As also discussed above, such connection(s) may be connection(s) for transmitting and receiving communications in some embodiments. As also discussed above, such connection(s) may be wired connection(s) in some embodiments. As also discussed above, such connection(s) may be wireless connection(s) in some embodiments. Such connection(s) may be constant or intermittent in some embodiments. In some embodiments, examples of such wireless connection(s) include WIFI, Bluetooth, and/or cellular data connection(s). In any event, regardless of the format of the power and/or communication(s) connection(s) between the control system and smartphone with which it is connected, if no power is received from the smartphone, the control system may proceed to step 503, in which it may attempt to access power from a strategic power reserve (e.g., a battery, capacitor, or a set of multiples thereof located within the smartphone case peripheral device) to power further operations, unless and until power is again provided from an external source (e.g., the smartphone, a wall outlet, or a wireless power source, in embodiments where wireless power receiving hardware is present within the control system), and then proceeds to certain subsequent steps (e.g., steps 533 et seq., which will be discussed in greater detail below.)

In general, the steps set forth in reference to FIG. 5 may be conducted in a wide variety of orders, and with or without various steps set forth herein, and with or without additional steps, while implementing aspects of the present invention, and as will be readily apparent to those of ordinary skill in the art. The exact order and number of steps set forth herein are only examples. For example, in some embodiments, the control system may simultaneously engage in steps 533 et seq. and steps 505 et seq., which also will be discussed in greater detail below.

If, instead, the control system determines that power is being provided to it by the smartphone in step 501, the control system proceeds to step 505 to assess the status of a communications connection with the smartphone and engage in further tasks. More specifically, in some embodiments, the control system determines whether such a communications connection is secure and/or whether the smartphone has been authenticated in accordance with a data access protocol. For example, in some embodiments, such a data access protocol may include an authenticated security token and/or certificate provided by the smartphone and identification of the smartphone as among a list of trusted devices maintained by the control system. In some embodiments, a secure login protocol or other security handshake may be initiated, validating the identity of the smartphone as a device permitted to engage in the further steps set forth below in various embodiments. In any event, the control system may perform any of such authentication steps and/or other steps and determine whether the smartphone is such a permitted device, in subsequent step 507. If the smartphone is not so permitted, the control system proceeds to step 509, where it may terminate further procedures with the smartphone and may block any communications with the smartphone (or other networks, in some embodiments) using a firewall before proceeding to steps 503 et seq., in some embodiments. If, however, the smartphone is determined to be so permitted, in step 507, the control system may proceed to steps 511 et seq.

Proceeding to step 511, once the smartphone has been so authenticated/permitted, the control system may next determine whether the smartphone is in "awake" state, meaning that it is ready to engage in operations and communications involving the control system. If not, the control system may proceed to steps 533 et seq. to engage in certain operations not necessarily directly involving the smartphone. If the smartphone is so awake, the control system instead may proceed to step 513, in which it receives updates and synchronizes at least some data and operations with the smartphone, in some embodiments. For example, in some embodiments, in subsequent step 515, the control system may update one or more databases related to a regimen of "squeeze reminders." Squeeze reminders, in accordance with aspects of the present application, may be scheduled alerts sent to a user of the control system, smartphone case peripheral device and smartphone which request that the user (e.g., through a graphical user interface ("GUI")) squeeze at least part of the smartphone case peripheral device to register a grip strength in accordance with some aspects of the invention set forth in this application for smartphone cases and/or peripheral devices monitoring user behavior. In some embodiments, such alerts may be delivered via haptic feedback (e.g., a distinct vibration, of a different pattern and/or intensity than other alerts issued) from the smartphone case peripheral device and/or smartphone. In other embodiments, such alerts may be delivered via visual GUI elements (e.g., a visual "push notification" delivered on a touchscreen) created on the smartphone case peripheral device and/or smartphone. Of course, the example embodiment provided here related to a smartphone case peripheral device that records handgrip strength is just one of potentially unlimited types of user behavior, actuation and characteristics thereof, which may be elicited and recorded by the control system in various embodiments of the invention, and should by no means be read to limit the scope of the invention. Most of the steps set forth in FIG. 5 can be applied in the context of any other type of user behavior and abilities to be monitored, as will be readily apparent to those of ordinary skill in the art. In some embodiments, such user behavior, and reminders and other actions related thereto, may be delivered in any suitable format. In some embodiments, such formats are even unstructured, "freeform," or otherwise specially created for a particular user or smartphone case peripheral device (e.g., based on history), in step 517. For example, in some embodiments, a third party (such as a doctor or other health practitioner or "coach") may request that particular types of data be solicited and generated by the smartphone case peripheral device and/or smartphone (e.g., through an associated application or "App") from a particular user. In some embodiments, the App itself may generate such requests for particular types of data, based on programming and data related to the user, provided by the user and/or coach. In some embodiments, the user may generate such data unsolicited by any alerts. For example, in some embodiments, a user may decide to squeeze the compressible members of a smartphone case peripheral device, performing an ad hoc grip strength test, or some other form of ad hoc physical and/or mental test (a.k.a., an "off-schedule squeeze," as noted in subsequent steps 525, et seq.).

In any event, the control system may or may not share such solicited and/or generated special data with the smartphone (or, in some embodiments, another network) in some embodiments. For example, in some embodiments, the control system may classify (e.g., using a GUI selection provided through the control system) that data as private, meaning that the user does not wish, or it would otherwise be inappropriate, to share that data with other persons (such as a coach) or in other places (other than the control system hardware present within the smartphone case peripheral device itself, and not even the smartphone) in step 519. Examples of such GUI selections are discussed in greater detail below, in reference to FIGS. 12 and 13. If, conversely, such data is not classified as private, such other persons or places are not barred from access to that data, and instead such data is shared with them, in step 521. In some embodiments, such a private classification indicates that the smartphone or the App will not have access to such special data. In step 523, the user may next indicate to the control system (e.g., after being queried by a GUI aspect) whether she or he, in fact, actually consents to share the data given a private classification, in which instance, the control system again does not bar access to that data, and instead shares it, in step 521. However, if such data is classified as private, and if the user does not so override the effects of that designation in step 523, the control system bars access to those data by other persons, other devices and other avenues, instead withholding those data on the control system hardware present within the smartphone case peripheral device itself, in step 531 (although, in some embodiments, a user may have the option to offload data from the smartphone case peripheral device to another device, or later share it, in some embodiments). In some embodiments, even the smartphone is barred from access to those data. In this sense, use of such data classified as private may be restricted to an authenticated user of the control system (and/or smartphone case peripheral device) and may reside only within the smartphone case peripheral device, for access and use by the user, through the control system and smartphone case peripheral device. In some embodiments, however, the smartphone case peripheral device may be given restricted access to display devices or other feedback devices within the smartphone and App, without storage (or, at least, long-term storage) on the smartphone, for the purpose of allowing the user to access and manipulate such data. However, in other embodiments, such display or other feedback devices are provided only within the smartphone case peripheral device itself. Some examples of such unique display and feedback devices included in the smartphone case peripheral device, separate from the smartphone, are discussed in greater detail elsewhere in this application.

In this instance of some special data created through the control system and smartphone case peripheral device, there may be some initial ambiguity as to the cause of that data. For example, in several embodiments physical hand controls or other special GUI hardware or software may register input from both a user and an environment. For example, in some embodiments discussed above, compressible members of various types may be included within the smartphone case peripheral device, and the control system may record the effect of unintentional insults from the environment (e.g., dropping the case, causing a compressible member to be compressed by impact with the ground) or input from a user (e.g., intentional squeezing of compressible members, to record grip strength) at times not scheduled for a strength or dexterity test of the user. In some such embodiments, the control system may determine (e.g., using a comparative algorithm or pattern matching) whether the input data from motion sensors more closely matches data associated with such an impact, e.g., because of its suddenness or speed of movement (a.k.a. "shock"), or whether the input data more closely matches data associated with manual actuation (e.g., having a more gradual, consistent acceleration curve). In step 527, it may determine whether manual actuation, or an environmental shock, has occurred, based on which data type the input most closely matches. For this purpose, example patterns or characteristics of data related to shock and manual actuation may be separately stored for such comparisons and algorithms implementing such a step within software run on computer hardware. If classified as a shock, sensor data may not be recorded, in some embodiments, or may be separately recorded, in other embodiments, and the control system may return to the start position. However, in some embodiments, the control system may first generate an active response to the shock, in step 529. For example, in some embodiments, the control system may generate force through actuators that ease the impact of the shock. For example, in some embodiments, such an active response may be the control system commanding a linear actuator of, or connected with, such a compressible member to initially retract the compressible member to eliminate resistance to the impact of the ground, matching its speed at impact, and then gradually increasing resistance to the impact, to decelerate the smartphone case peripheral device safely, with less damage done to it and/or a smartphone held within it. As another example, in some embodiments, the control system may command actuators to provide a safety barrier between the smartphone case peripheral device and the smartphone (e.g., extending additional cushioning or creating additional space, between the smartphone and the ground.) The control system may then return to the starting position. If, however, the control system determines that manual actuation, rather than an environmental shock, has occurred, in step 527, the control system may instead determine that an off-schedule squeeze has taken place, and may store those data within the smartphone case peripheral device only, classifying it as private and barring other access to those data, in step 531, as discussed above, and the control system may return to the starting position.

Returning to steps 533 et seq., the control system, being separate from the smartphone, may conduct a number of functions without necessarily directly or currently interacting with the smartphone, in some embodiments. For example, if no power is received from a smartphone, in steps 501 through 503, as discussed above, or if no secure, authenticated connection is present between the control system and the smartphone, or if the smartphone is not presently awake, the control system may proceed to step 533. In some embodiments, in step 533, the control system then queues up any scheduled alerts or other activities required for monitoring a user from an internal memory. The control system may then send such scheduled alerts (i.e., "standard" reminders) and engage in data gathering and other activities, such as monitoring a user's grip strength or other performance or statuses, at such scheduled times, in step 535.

In some embodiments, such data gathering will take place only when a user provides such data in response to an alert, reminder or prompt to provide that data (e.g., testing her or his grip strength) within a particular interval of time following the time of that alert, reminder or prompt. Thus, in step 537, the control system may determine whether a user has provided such data, within such an interval and, if so, records those data in step 539. If not, the control system may simply return to the starting position. Examples of such data gathered, as discussed elsewhere in this application include a maximum grip strength (e.g., determined by a peak average pressure, or total pressure achieved by a user actuating compressible members of a smartphone case peripheral device), speed, reaction time, agility, or a more sophisticated test, as discussed elsewhere in this application. For example, in some embodiments, more complex data from multiple such compressible members may be assessed and recorded. In some such embodiments, the control system may issue instructions to the user in addition to reminders instructing the user to attempt particular actuation patterns, using particular hand(s) or finger(s), to more particular test different strength and dexterity abilities of the user. In some embodiments, discussed in more detail below, even more complex, unlimited dexterity, strength, and mental performance tests, can be conducted using particular embodiments of the control system and smartphone case peripheral device, many of which are discussed at length in this application. The control system then returns to the starting position, or may again connect with the smartphone, sync and share the recorded data with the smartphone, and, in some embodiments, an authorized third-party, in accordance with other steps of the figure (e.g., steps 521 et seq., and steps 501 et seq.)

The steps set forth herein are illustrative, not exhaustive, of the many different orders, numbers, sequences, partial sequences, arrangements and combinations of steps that may be executed to carry out various aspects of the present invention. In practice, such numbers, sequences, partial sequences, arrangements and combinations are virtually unlimited, and impossible to enumerate individually. As will be readily apparent to those of ordinary skill in the art, all such alternate orders, numbers, partial sequences, arrangements and combinations fall within the scope of the invention. Although some steps have been listed as "optional," for ease of understanding, above, it should be understood that other steps may also be omitted or included in particular embodiments carrying out aspects of the invention. This specification should be interpreted as separately stating that each of any aspect disclosed anywhere within the specification (such as a step) is included, and omitted, and included and omitted in any possible combination with one another, in alternate embodiments of the invention.

As mentioned above, the mention or discussion of any specific examples of the invention, and any aspect of the invention within this application is for illustration purposes only, to provide context and illustration of principles and aspects of the invention far broader than those examples, and those examples in no way limit the scope of the present invention. For example, embodiments provided throughout this application, including the devices and GUI elements set forth in the figures and discussed in detail in this application are, of course, examples, and not limiting. Rather, these embodiments are intended only as a reasonable set of possible example structures, substructures, materials, methods, steps and other aspects of the present invention, among virtually infinite and innumerable possibilities for carrying out the present invention, to ease comprehension of the disclosure, as will be readily apparent to those of ordinary skill in the art. For example, the description of one particular order, number or other arrangement of any aspects of the present invention set forth herein is illustrative, not limiting, and all other possible orders, numbers, etc., are also within the scope of the invention, as will be so readily apparent. Any aspect of the invention set forth herein may be included with any other aspect or embodiment, as well as any aspects known in the art, in any number, order, arrangement, or alternative configuration, while still carrying out, and falling within, the scope of the invention.

Figure 6:
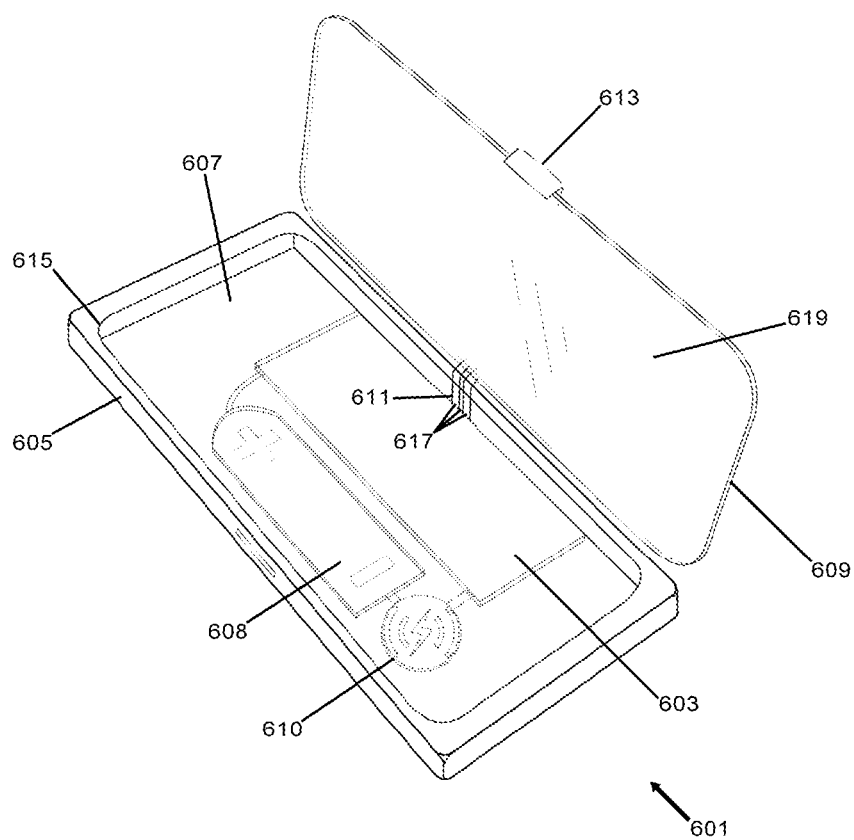
FIG. 6 is a perspective view of another example smartphone case peripheral device configured to provide an array of behavior-monitoring sensors within an example touchscreen cover, in accordance with some embodiments.

FIG. 6 is a perspective view of another example smartphone case peripheral device 601 with an array of behavior-monitoring sensors within an example touchscreen cover, in accordance with some embodiments of the invention. As with some other embodiments of smartphone case peripheral devices provided in this application, smartphone case peripheral device 601 is configured to separately interact with a user and record a user's abilities periodically. In some embodiments, again as with some other embodiments of smartphone case peripheral devices provided in this application, a separate control system from any control system within a smartphone, included within smartphone case peripheral device 601, may be provided—such as example control system 603. Also, as with other embodiments of smartphone case peripheral devices provided in this application, the separate control system includes computer hardware and software in some embodiments, and may be a control system such as that set forth in reference to FIG. 4, above. Also, as with other embodiments of smartphone case peripheral devices provided in this application, smartphone case peripheral device 601 includes a protective housing 605 and an internal smartphone-receiving section 607 in some embodiments. In some such embodiments, control system 603 includes a flattened shape, and may be held within a wall abutting smartphone-receiving section 607 in some embodiments—as pictured. As also discussed for other smartphone case peripheral devices provided in this application, in some embodiments, smartphone case peripheral device 601 includes an on-board power source connected for powering operations of control system 603, such as example battery or capacitor power pack 608, which also may have a flattened form factor and reside in a space within smartphone case peripheral device 601 abutting smartphone-receiving section 607. In some embodiments, as discussed above, smartphone case peripheral devices such as smartphone case peripheral device 601 may receive power from an external source, such as a smartphone connected to smartphone case peripheral device 601 through physical conductors, or from a wireless power source, in some embodiments. Accordingly, a wireless power receiver 610 is included in smartphone case peripheral device 601 in some embodiments. In some embodiments, however, wireless power receiver 610 is alternatively or additionally a wireless power transmitter, and thus may transfer power from example battery or capacitor power pack 608 to a smartphone held within smartphone-receiving section 607.

Although, as with other embodiments of smartphone case peripheral devices provided in this application, a smartphone-receiving section 607 is optionally shown without a smartphone encased within it, in order to better illustrate the nature of example smartphone case peripheral device 601 alone. In such an embodiment, smartphone-receiving section 607 may include an internal void with a shape complementary to, or otherwise configured to hold, at least part of the outer surface of a smartphone. Separately, example smartphone case peripheral device 601 may include a hinged touchscreen cover 609 in some embodiments, which is shown unfastened and ajar in the present figure to allow for the installation of a smartphone within smartphone-receiving section 607. Although the example of a hinged touchscreen cover is provided, of course, any number of other forms of touchscreen covers with or without a hinge 611 may be included in different embodiments of the invention.

In some embodiments including such a hinge, a locking clip 613 for closing hinged touchscreen cover 609 may be included to allow a user to bind and better hold a smartphone within smartphone-receiving section 607 (e.g., enhancing a water-tight seal created by rubberized gasket and smartphone holding lip 615). In some embodiments, hinge 611 may serve more than a structural role allowing touchscreen cover 609 to swivel, opening and closing smartphone-receiving section 607. In some such embodiments, hinge 611 may comprise a series of conducting leads 617 connecting control system 603 and touchscreen cover 609, allowing control system 603 to monitor and control activities using actuators and display pixels within touchscreen cover 609 and receive input from and deliver output to it. Touchscreen cover 609 itself is a new form of user behavior monitoring hardware which may be overlaid onto, enhance, or create certain functions related to the actuation of a smartphone installed within smartphone-receiving section 607 in some embodiments. In some embodiments, hinged touchscreen cover 609 may cover, alter the appearance of, and allow separate actuation of the touchscreen of a smartphone, while still allowing a user to view information on such a touchscreen. Hinged touchscreen cover 609 also includes one or more sensors configured to monitor the physical abilities of a user, and, more specifically, activities related to GUI elements appearing on or relative to such a touchscreen.

In some embodiments, hinged touchscreen cover 609 includes an array of transparent touch sensors within a transparent auxiliary touch screen 619, which is overlaid onto the touchscreen of a smartphone when installed in smartphone case peripheral device 601. In some embodiments, in addition to recording touches and gestures from a user performed on transparent screen 611, smartphone case peripheral device 601 also transmits such touches and gestures to the touchscreen of the smartphone. In some such embodiments, such touches and gestures are directly transmitted to the touchscreen of the smartphone through transparent screen 611 (e.g., via physical flexibility enabling touch transmission, or, in the case of galvanically-actuated touchscreens, a matrix of galvanic conductors or other actuators bridging entirely across transparent screen 611). However, in some embodiments, at least some such gestures may not be transmitted or, at least, may not be directly transmitted to the touchscreen of the smartphone through transparent screen 611. Instead, the control system within smartphone case peripheral device 601 may serve as a gatekeeper, selecting, modifying or enhancing such transmissions, and then transmitting them through actuation of such a matrix of actuators, to the touchscreen. In some embodiments, such an auxiliary touch screen may be included within, on, or about a smartphone itself. In other embodiments, such an auxiliary touchscreen may be provided within a lower profile smartphone case without such an internal smartphone-receiving section (e.g., a "screen protector" including such an auxiliary touchscreen and/or control system). In some embodiments, such an auxiliary touchscreen is provided without separate control system from the smartphone. In some such embodiments, a virtual machine or otherwise separately designated portion of the smartphone control system may simulate or act as a separate control system designated for a smartphone case peripheral device, as set forth in this application. However, in other embodiments, such an auxiliary touchscreen is, as with several other smartphone case peripheral devices set forth in the present application, provided with a separate control system, other than any control system within a smartphone.

Figure 7:
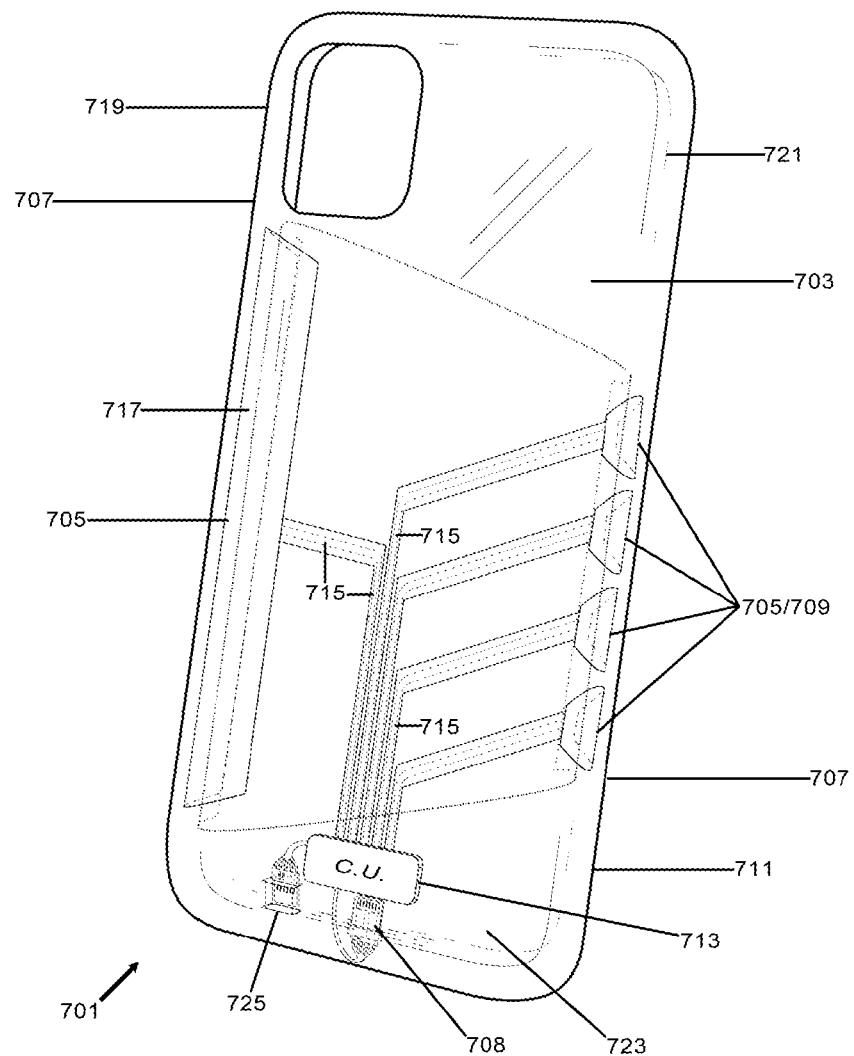
FIG. 7 is a perspective view of another example smartphone case peripheral device configured to provide other forms of low-profile behavioral monitoring sensors, in accordance with some embodiments.

FIG. 7 is a perspective view of another exemplary empty smartphone case peripheral device 701 configured to provide other forms of low-profile behavioral monitoring sensors, in accordance with some embodiments. As with other smartphone case peripheral devices set forth in the present application, smartphone case peripheral device 701 includes a protective housing 703 which may at least partially surround and protect an outer surface of smartphone (not pictured in the present figure). In addition, and also as with other smartphone case peripheral devices set forth in the present application, smartphone case peripheral device 701 may include one or more sensors configured to monitor the physical abilities of a user. In some embodiments, one or more pressure sensors, such as any of the example pressure sensors 705 shown lining part of the lengthwise sides 707 of smartphone case peripheral device 701, are provided. For example, in some embodiments, a group of such sensors, such as example aligned sensors 709, cover at least part of one of the two lengthwise sides 707—namely, lengthwise side 711, as pictured. In some such embodiments, such a group of sensors allow for different readings and analysis of inwardly-applied pressure on different areas of lengthwise side 711. As will be explained further below, in some embodiments, aligned sensors 709 may cover such areas at locations corresponding with the natural placement of a user's fingers when holding a smartphone or smartphone case, such as smartphone case peripheral device 701. Thus, in some embodiments, a user may interact with smartphone case peripheral device 701 while allowing smartphone case peripheral device 701 to monitor her or his behavior and other personal characteristics, without deviating from her or his ordinary hand placement on smartphone case peripheral device 701. In addition, smartphone case peripheral device 701 can separately sense and record readings related to pressure from each of a user's fingers using an on-board control system, such as example control system 713, shown within smartphone case peripheral device 701. As with other control systems set forth in the present application, control system 713 may be a control system such as that set forth in reference to FIG. 4, in some embodiments. Each of example aligned sensors 709 may be separately connected and able to communicate signals with control system 713, which may therefore separately monitor, record, and analyze readings from each of aligned sensors 709, for example, via separate electrically-conductive leads, such as the examples pictured as 715.

In some embodiments, smartphone case peripheral device 701 may include a wide variety of other numbers and arrangements of different forms of pressure sensors in addition to, or instead of, example aligned sensors 709. For example, as pictured, in some embodiments, smartphone case peripheral device 701 includes a substantially whole-surface or whole-edge sensor, such as example full edge sensor 717, in some embodiments. Such a whole-surface or whole-edge sensor covers substantially more of one of lengthwise sides 707 of smartphone case peripheral device 701, such as example other side 719 of smartphone case peripheral device 701, than aligned sensors 709 do, in some embodiments. For example, in some embodiments, such a whole-surface or whole-edge sensor covers all, or substantially all, of the circumference of side 719. In some embodiments, such a whole-surface or whole-edge sensor covers all, or substantially all, of the surface of smartphone case peripheral device 701. Thus, as with the pressure from a user's fingers in relation to aligned sensors 709, example full edge sensor 717 may also take readings and analysis of inwardly-applied pressure on different areas of example other side 719, in some embodiments. Full edge sensor 717 may cover areas of smartphone case peripheral device 701 at locations corresponding with the natural placement of a user's thumb, thumb joint, thumb web and/or the palm and/or heel of her or his hand when holding a smartphone or smartphone case, such as smartphone case peripheral device 701, examples of which will be discussed in greater detail below. Thus, in some embodiments, a user may interact with smartphone case peripheral device 701 while allowing smartphone case peripheral device 701 to monitor her or his behavior and other personal capabilities or characteristics, without deviating from her or his ordinary hand placement on smartphone case peripheral device 701. In addition, smartphone case peripheral device 701 can separately sense and record readings related to pressure from each of a user's fingers, thumb, and palm of her or his hand, using a control system such as example control system 713 shown within smartphone case peripheral device 701.

In some embodiments, any sensors of smartphone case peripheral device 701, such as aligned sensors 709 and/or full edge sensor 717, may be located on the surface of protective housing 703 of smartphone case peripheral device 701. However, in some embodiments, as pictured, such sensors are located on an interior, smartphone-facing surface 721 of smartphone case peripheral device 701. In some such embodiments a user may apply pressure to part of the surface of protective housing 703, and such sensors located below such parts of the surface of protective housing 703 may detect pressure exerted by the interior smartphone-facing surface of smartphone case peripheral device 701. In some such embodiments, the pressure thus detected may be better isolated to, and correspond with, pressure on specific points or regions of smartphone case peripheral device 701 by smartphone case peripheral device 701 consisting of or including a flexible (e.g., silicone-based, rubber, or otherwise pliable) material, and pressure exerted at particular points on the outer surface of smartphone case peripheral device 701 translates into highly localized readings at sensors directly beneath such particular points. However, in some embodiments, rigid materials, in all or portions of smartphone case peripheral device 701, may be included, alternatively, or in addition.

In some embodiments aligned sensors 709 and/or full edge sensor 717 may be in a different, or additional, form than pressure sensors. For example, in some embodiments, aligned sensors 709 and/or full edge sensor 717 may include a galvanic sensor for measuring the galvanic skin resistance or response of parts of a user's hand. For example, in some embodiments, aligned sensors 709 and/or full edge sensor 717 may include an optical sensor for measuring changes in skin flushing or other color and visible state changes of parts of a user's hand. For example, in some embodiments, aligned sensors 709 and/or full edge sensor 717 may include an analyte detector and measurement device for measuring the presence and concentration of an analyte from a user's hand. In some embodiments, aligned sensors 709 and/or full edge sensor 717 may include electrodes for testing a user's skin or muscle tone, through her or his fingers when touching such electrodes. In some such embodiments, aligned sensors 709 and/or full edge sensor 717 may sense and record partial contraction of muscles within the user's hand. In some embodiments, aligned sensors 709 and/or full edge sensor 717 may sense and record a pre-contraction condition of the user's hand. In some embodiments one of the above such sensing may be used to determine a measure related to a user's health. In some embodiments, more than one of the above such sensing may be used to determine a measure related to a user's health. For example, in some embodiments, one of the above such sensing may be used to estimate a user's grip strength. In some such embodiments, such an estimate of a user's grip strength may be made without requiring the user to apply her or his maximum grip to sensors 709 and/or full edge sensor 717. As another example, in some embodiments, in some embodiments, one of the above such sensing may be used to determine a heart rate of a user. As another example, in some embodiments, one of the above such sensing may be used to determine an anxiety level of a user. As another example, in some embodiments, one of the above such sensing may be used to determine an inflammation level of a user. As another example, in some embodiments, one of the above such sensing may be used to determine the level of an analyte within a user's skin or a bodily fluid. As another example, in some embodiments, one of the above such sensing may be used to determine another biomarker of a user.

As with other smartphone case peripheral devices set forth in the present application, smartphone case peripheral device 701 may include a wired and/or wireless gateway for sending communications and/or transferring power to and from a smartphone, in some embodiments. For example, in some such embodiments, smartphone case peripheral device 701 may include any of the hardware for communications and power transfer set forth elsewhere in this application. As another example, in some such embodiments, smartphone case peripheral device 701 may include any suitable hardware for communications and power transfer known in the art. For example, in some embodiments, a serial communications plug 708 is provided at the base of a smartphone-receiving section 723 of smartphone case peripheral device 701 (such that it will interface with the serial communications port of the smartphone, when installed therein). As with other serial communications hardware set forth in the present invention, serial communications plug 708 may be electrically connected to, and allow for reversible, temporary communications and power connections between smartphone case peripheral device 701 and a smartphone held within smartphone case peripheral device 701 (not pictured in the present figure). In the example pictured, serial communications plug 708 is shown as similar in format to an APPLE "LIGHTNING" serial plug. However, it should be understood that any suitable format for connecting smartphones with peripheral devices may, instead or in addition, be used for serial communications plug 708.

In some embodiments, an auxiliary serial communications port 725 may also be provided. Example auxiliary serial communications port 725 may be electrically connected to and allow for another reversible, temporary communications and power connections between smartphone case peripheral device 701 and another peripheral device, in some embodiments. In some embodiments, serial communications port 725 may be disposed on the exterior of smartphone case peripheral device 701, and, in such a position, can be accessed by a serial communications plug of the same or a compatible format. Again, although serial communications port 725 is shown as similar in format to an APPLE "LIGHTNING" serial communications format, it should be understood that any suitable format for connecting smartphones with peripheral devices may, instead or in addition to that example, be used for serial communications port 725.

Figures 8, 9:
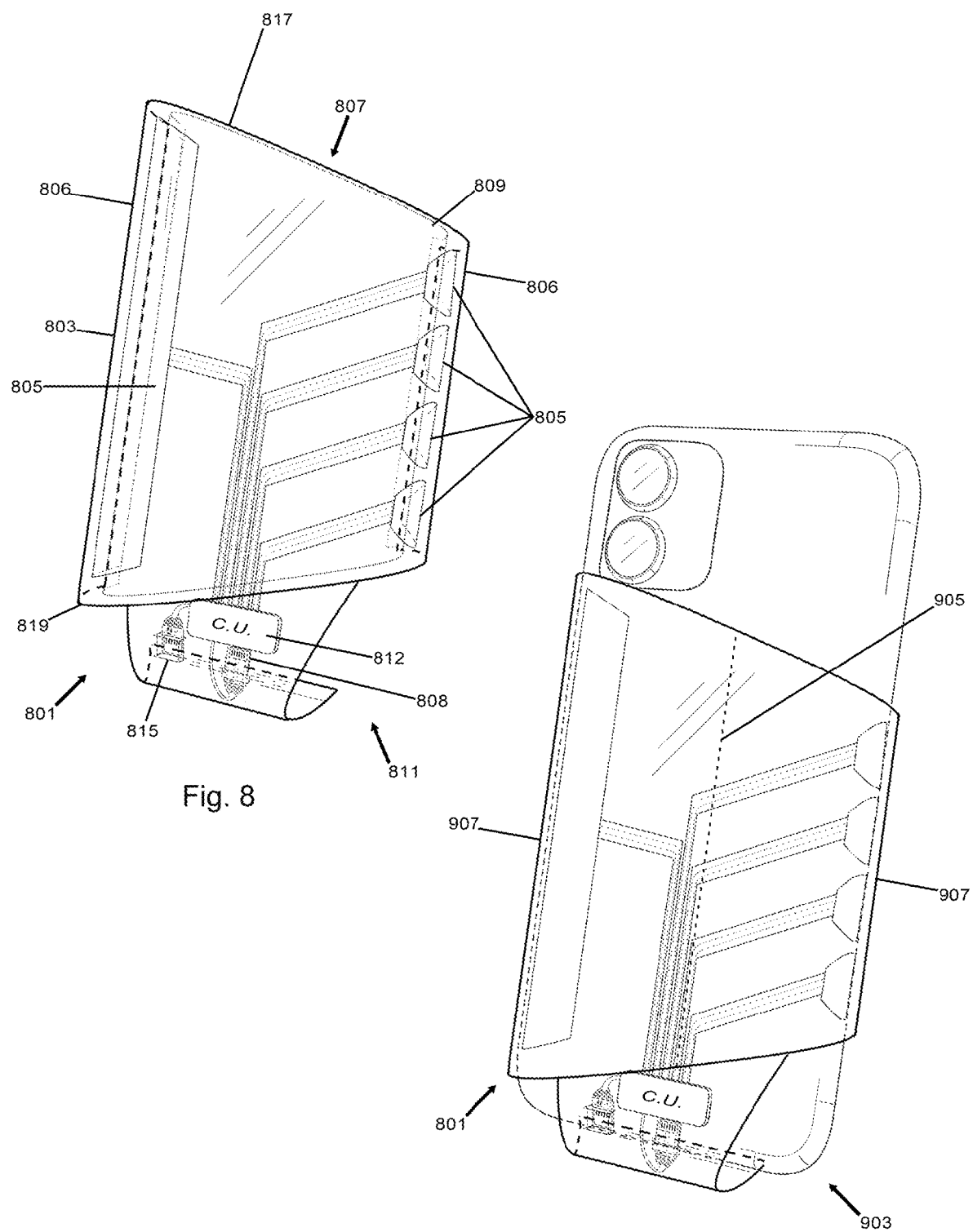
FIG. 8 is a perspective view of another example smartphone case peripheral device, configured to provide low-profile behavioral monitoring sensors with a more abbreviated form factor only partially covering such a smartphone, in accordance with some embodiments.
FIG. 9 is a perspective view of the smartphone case peripheral device shown in FIG. 8, wherein the case includes a smartphone disposed therein such that the case partially covers the smartphone, in accordance with some embodiments of the invention.

FIG. 8 is a perspective view of another example smartphone case peripheral device 801, ready to receive a smartphone, also providing some low-profile behavioral monitoring sensors, and having a more abbreviated form factor, only partially covering such a smartphone, in accordance with some embodiments of the invention. As with other smartphone case peripheral devices set forth in the present application, smartphone case peripheral device 801 includes a protective housing 803, which may at least partially surround and protect an outer surface of smartphone (as pictured in the following figure). In addition, and also as with other smartphone case peripheral devices set forth in the present application, smartphone case peripheral device 801 includes one or more sensors configured to monitor the physical activities, abilities and/or characteristics of a user, in some embodiments. In some embodiments, one or more pressure sensors, such as any of the example pressure sensors 805 shown lining part of the lengthwise sides 806 of smartphone case peripheral device 801, are provided. Pressure sensors 805 are pictured as being similar in form and nature to pressure sensors shown previously, in reference to FIG. 7, above. And as mentioned with respect to FIG. 7, and other sensors of smartphone case peripheral devices in the present application, pressure sensors 805 may, instead, or in addition, be any other sensor type, arrangement and combination thereof discussed in reference to FIG. 7, or anywhere else in this application. Generally speaking, pressure sensors 805 and any other sensors for sensing, recording and analyzing a user's behavior set forth in this application, may be any sensor type, arrangement and combination thereof known in the art which is suitable for sensing human's behavior, capabilities, biomarkers and analytes, in various embodiments. For example, in some embodiments, any of sensor(s) 805 may be one or more optical or motion sensor(s), in addition to or instead of pressure sensor(s). As another example, in some embodiments, any of sensor(s) 805 may be one or more infrared sensor(s), in addition to or instead of pressure sensor(s) or optical or motion sensor(s). As yet another example, in some embodiments, any of sensor(s) 805 may be one or more proximity sensor(s), in addition to or instead of pressure sensor(s), optical or motion sensor(s), or infrared sensor(s).

In any event, in some embodiments, pressure sensors 805 may be in an arrangement as pictured which, as with the arrangement for sensors 705, discussed above, are positioned to sense, monitor and facilitate the analysis of a user's hand and finger position, movements, and other characteristics of the user, as the user interacts with a smartphone case peripheral device, and a smartphone held within or related to it.

However, as mentioned above, protective housing 803 has a more abbreviated form factor than that of some other smartphone case peripheral devices set forth in this application, in some embodiments. For example, in some embodiments, protective housing 803 includes an open top 807, which, unlike protective housing 703 of smartphone case peripheral device 701, does not completely surround the top end of a smartphone, even when the smartphone is installed into the smartphone-receiving section, such as example smartphone-receiving section 809, of smartphone case peripheral device 801. In some embodiments, an at least partially open bottom 811 is also included in smartphone case peripheral device 801. In some embodiments, open bottom 811 may, as with open top 807, not completely surround an end of a smartphone, even when the smartphone is installed into smartphone-receiving section 809. However, in some embodiments, open bottom 811 may so completely surround the bottom end of a smartphone. In still other embodiments, as pictured, open bottom 811 may partially surround the bottom end of a smartphone, providing some, but not completely-surrounding, protection for such an end of a smartphone. In some embodiments, open bottom 811 still houses and supports a wired and/or wireless gateway for sending communications for a control unit (now example control unit 812) of smartphone case peripheral device 801 and/or transferring power to and from the control unit, to and from a smartphone, whether or not it includes such a more abbreviated form factor. For example, as pictured, open bottom 811 includes a serial communications plug, now shown as serial communications plug 808, located at the base of a smartphone-receiving section 809 of smartphone case peripheral device 801 (such that it will interface with the serial communications port of the smartphone, when installed therein) and an auxiliary serial communications port, now 815, each of which may be of a similar nature to hardware set forth above in reference to FIG. 7.

In some embodiments, as pictured, the form of smartphone case peripheral device 801 may conform to or otherwise match or mirror users' typical hand position while holding and using a smartphone held within a case. For example, as pictured, and as discussed elsewhere in this application, the top 807 and/or the bottom 811 may be disposed at an angle relative to the overall length of smartphone case peripheral device 801 or a smartphone held within it. In some such embodiments, such an angle is selected to match or accommodate the angle of a users' hand relative to the overall length of smartphone case peripheral device 801 or a smartphone held within it. In some embodiments, the top 807 and/or the bottom 811 or any other edge, area or surface of smartphone case peripheral device 801 may be otherwise shaped or formed to compliment the form of a human hand (e.g., having surface(s) or edge(s) that are curved to match or accommodate curves of the human hand, such as example edge curve 817 and example edge curve 819). Some typical hand positions for a user of such a smartphone case peripheral device and/or a smartphone are discussed in reference to FIGS. 10 and 11, below.

FIG. 9 is a perspective view of the same example smartphone case peripheral device 801 shown in FIG. 8, above, but after receiving and partially covering a smartphone, such as example smartphone 903, in accordance with some embodiments of the invention. As discussed above in reference to FIG. 8, a central lengthwise line 905 can be conceptualized parallel with outer lengthwise edges 907 of smartphone case peripheral device 801 and at the center of smartphone 903, when properly installed within smartphone-receiving section 809 and smartphone case peripheral device 801. As discussed above, the top 807 and/or the bottom 811 are shown disposed at an angle relative to this central lengthwise line 905 and the overall length of the smartphone case peripheral device 801 or the smartphone held within it—namely, smartphone 903, in the example pictured.

Figure 10:
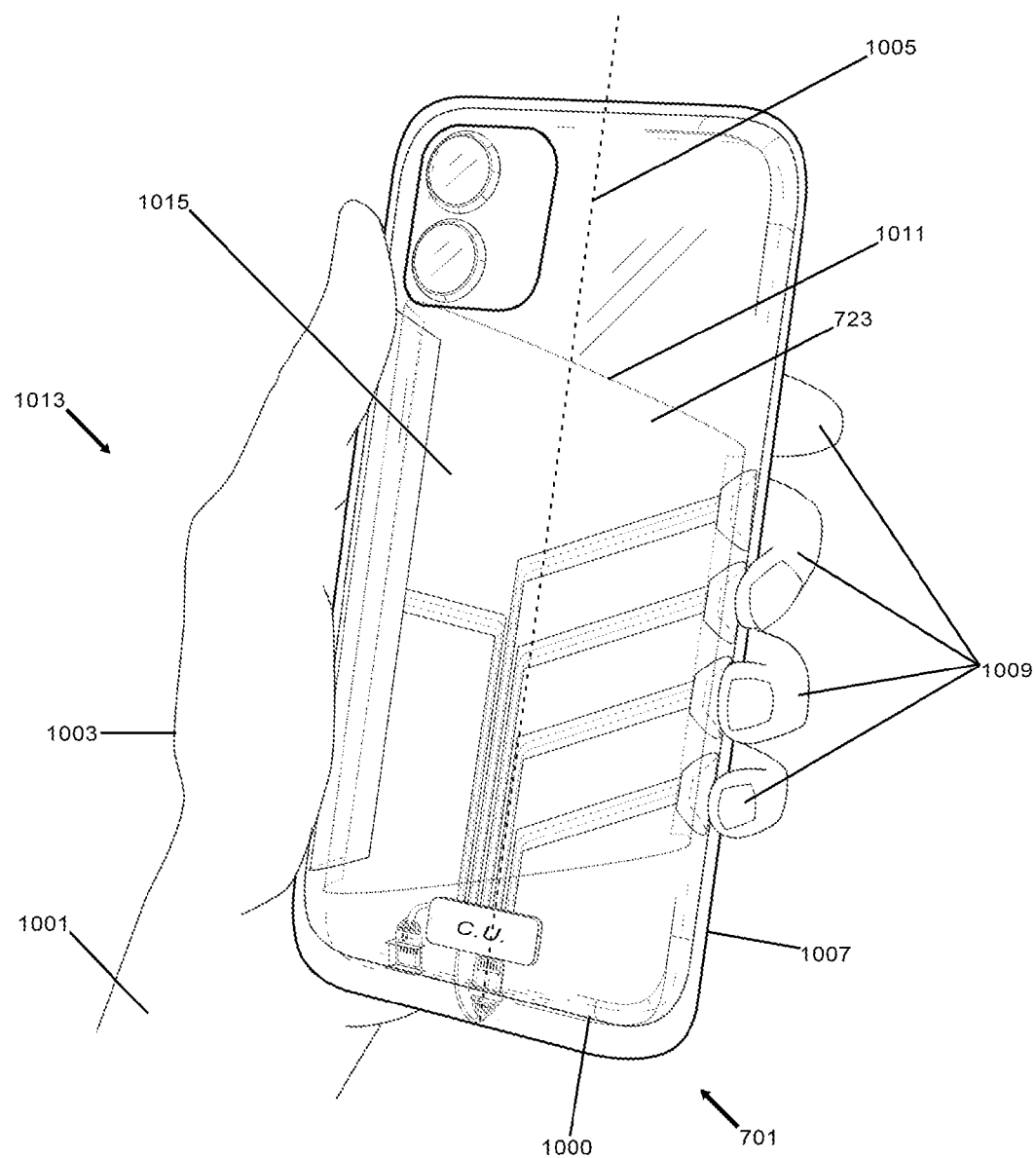
FIG. 10 is a perspective view of the smartphone case peripheral device shown in FIG. 7, wherein the case includes a smartphone disposed therein such that the case covers at least part of the smartphone in accordance with some embodiments.

FIG. 10 is a perspective view of the same example smartphone case peripheral device 701, shown in FIG. 7, above, partially covering at least part of an example smartphone 1000, and in use by an example user 1001, in accordance with some embodiments of the invention. User 1001 is shown holding smartphone case peripheral device 701 in her hand 1003, and in a typical hand position for user 1001 when holding a smartphone within smartphone case peripheral device 701. As pictured, her hand is generally forming an angle relative to the overall length of smartphone case peripheral device 701 and the smartphone held within it, and relative to a central lengthwise line 1005 parallel with outer lengthwise edges, such as example lengthwise edge 1007, of smartphone case peripheral device 701, and at the center of smartphone 1000. As a result, the location of pressure sensors 705 corresponds with the location of at least some of user's 1001 fingers 1009, and this is able to record data related to the user's fingers and hand as discussed above (e.g., movement(s), contact(s), grip strength(s) and/or pressure therefrom).

Smartphone case peripheral device 1001 may include an internal support structure 1011 in some embodiments. Internal support structure 1011 may include a rigid material suitable for surrounding, protecting, preventing and/or reducing the compression of smartphone 1000 when a user presses on the outer surface of protective housing 703 of smartphone case peripheral device 701. In some embodiments, internal support structure 1011 surrounds at least part of smartphone-receiving section 723, forming a protective, rigid cage around it. In some embodiments, however, internal support structure 1011 may comprise a cushioning or elastomeric material with or without such a rigid material, and may protect a smartphone held within smartphone-receiving section 723. As with top 807 and/or the bottom 811, discussed above, internal support structure 1011 may be disposed at an angle relative to the overall length of the smartphone case peripheral device and a smartphone held within it (such as example smartphone 1000, as pictured), matching, mirroring, or otherwise complementary to a typical hand position (such as that pictured, as typical hand position 1013).

In some embodiments, an additional support structure or component may be included having a structure that is a mirror image of at least part of internal support structure 1011, and some such embodiments may include sensors in a mirror image configuration of that shown for sensors 705, relative to central lengthwise line 1005. In such embodiments, a user with the opposite dominant hand than user 1001, holding smartphone 1000 with an opposite hand to that pictured, may use smartphone case peripheral device 701 to better record and monitor her or his behavior and biometrics (e.g., grip strength using pressure and/or compression sensors, using techniques discussed elsewhere in this application). Similarly, the same user 1001, using her same hand 1003, may similarly better record and monitor his or her behavior and biometrics when smartphone case peripheral device 701 and/or smartphone 1000 is rotated 180 degrees about central lengthwise line 1005 than the position pictured. For example, when a GUI relevant to using smartphone case peripheral device 701 is presented on the touchscreen of smartphone 1000, a user may wish to observe and interact with such a GUI, and may be required to so rotate smartphone case peripheral device 701 and/or smartphone 1000.

However, in some embodiments, an additional display, other than the touchscreen of the smartphone, may be included on the outer surface of the back side 1015 smartphone case peripheral device 701, facing away from the palm of user 1001's hand. In some such embodiments, a user may interact with such an additional display and an additional GUI presented on it by control system 713 and perform any operations specific to smartphone case peripheral devices set forth in this application. As discussed elsewhere in this application, in some such embodiments, at least some such operations, and data related to them, are not communicated, or at least are not directly communicated, with a control system within the smartphone. Thus, such an additional display may aid in the independent management and control of private user data, in some embodiments.

Figure 11:
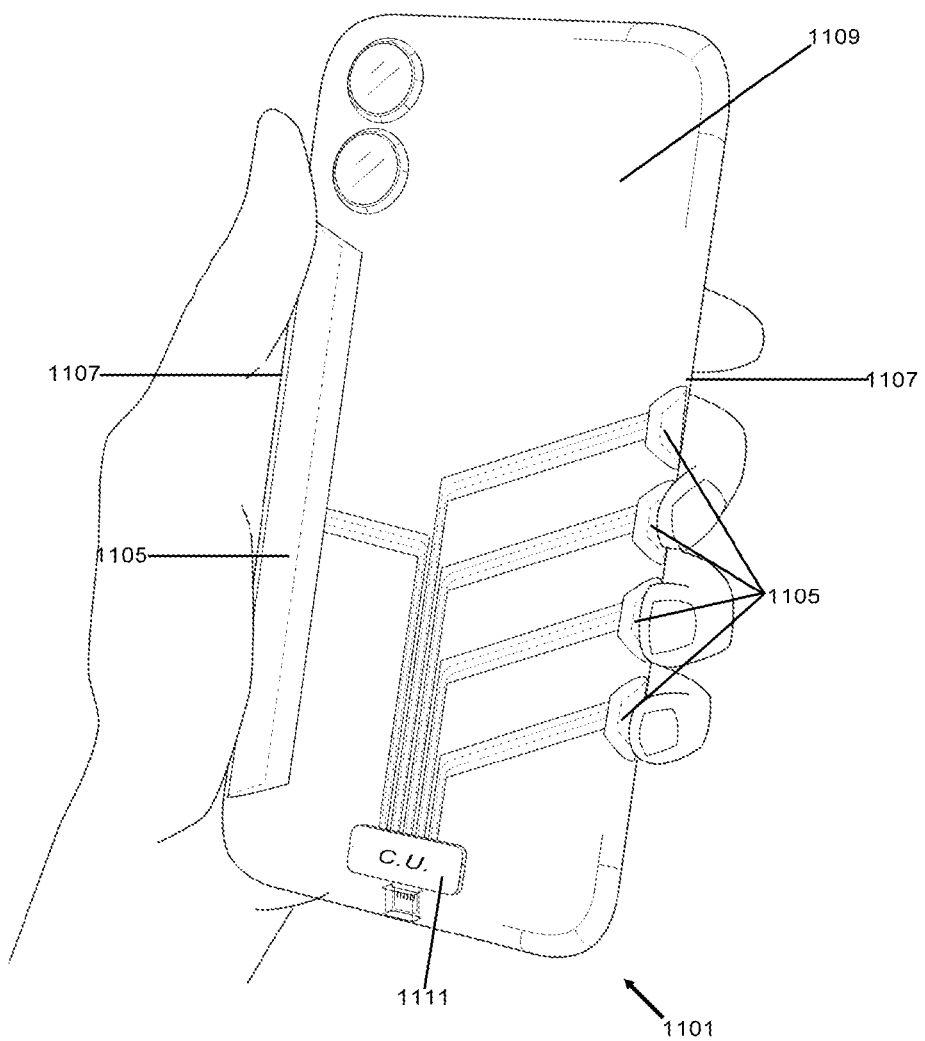
FIG. 11 is a perspective view of an example smartphone including sensors configured to monitor the physical abilities of a user within its protective housing, in accordance with some embodiments.

FIG. 11 is a perspective view of an example smartphone 1101, including sensors configured to monitor the behavior, physical characteristics, and/or abilities of a user within its protective housing, in accordance with some embodiments of the invention.

As with smartphone case peripheral devices set forth in the present application, smartphone 1101 itself includes one or more sensors (and any sensors set forth in the present application) configured to monitor the physical activities, abilities and/or characteristics of a user, in some embodiments. Thus, in some embodiments, one or more pressure sensors 1105, shown lining part of the lengthwise sides 1107 of smartphone 1101, are included. Pressure sensors 1105 are pictured as being similar in form and nature to pressure sensors shown previously, for example, in reference to FIGS. 7 and 8, above. And as mentioned with respect to FIGS. 7 and 8, and other sensors of smartphone case peripheral devices in the present application, pressure sensors 1105 may, instead, or in addition, be any other sensor type, arrangement and combination thereof discussed in reference to any embodiments of the invention set forth in this application. As mentioned previously, pressure sensors 1105 and any other sensors for sensing, recording and analyzing a user's behavior or characteristics set forth in this application, may be any sensor type, arrangement and combination thereof known in the art, which is suitable for sensing human's behavior, in various embodiments.

However, rather than having such sensors line, or partially line, the housing of a smartphone case peripheral device, the example pressure sensors 1105 of smartphone 1101 are present directly on or within the outer surface 1109 of smartphone 1101.

Thus, many of the techniques for sensing, monitoring and analyzing a user's activities, abilities and other characteristics set forth in this application may be carried out using smartphone 1101 instead of (or in addition to, in some embodiments) using a peripheral device, such as any of the smartphone case peripheral devices set forth in this application. In some embodiments, a separate control system, other than the control system used to conduct other operations of the smartphone, may be included—such as example auxiliary smartphone control system 1111. In some such embodiments, any of the operations set forth above for control units included within any smartphone case peripheral device may instead be conducted using such an auxiliary smartphone control system. Also in some such embodiments, such an auxiliary control system may have at least some separate data storage and operations, segregated from data storage and operations of the control system used to conduct other operations of the smartphone.

Figure 12:
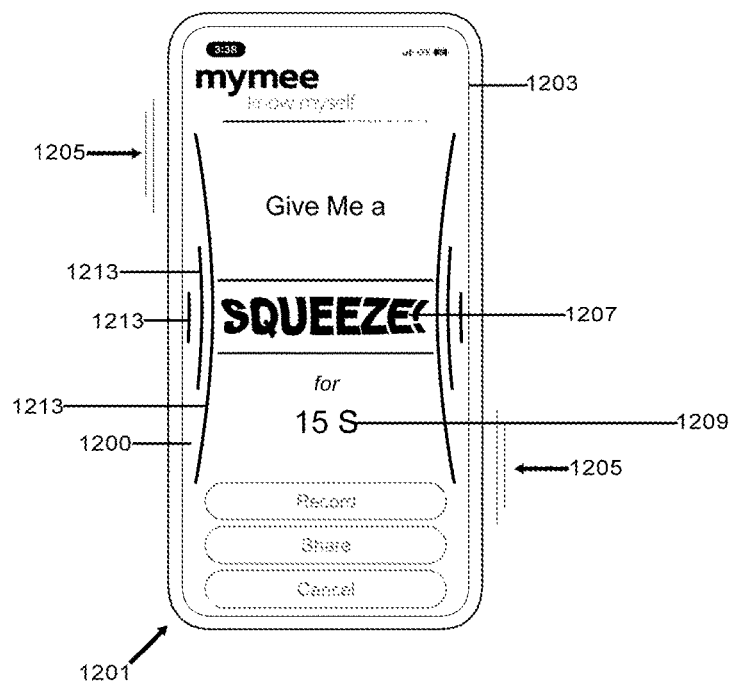
FIG. 12 is a front view of an example user interface implementing some example aspects of the present embodiments related to monitoring and gathering user capability and behavior data with a smartphone and/or smartphone case.

FIG. 12 is a front view of an example user interface 1200, implementing some example aspects of the present invention related to monitoring and gathering data related to a user's behavior, physical characteristics, and/or abilities with a smartphone, such as example smartphone 1201, and/or with a smartphone case peripheral device. Although the example of a smartphone 1201, which may, in some embodiments, be a smartphone such as smartphone 1101, discussed above, is provided, it should be understood that such a smartphone or smartphone case peripheral device may be, or may be in a form similar to, any of the example smartphones and smartphone case peripheral devices set forth in this application for monitoring, recording and/or analyzing behavior, physical characteristics, and/or abilities of a user, in some embodiments of the invention. Thus, although example user interface 1200 is shown on a front touchscreen 1203 in the embodiment pictured, in some embodiments, example user interface 1200 may be provided on any form of electronics, or peripheral electronics (e.g., such as a peripheral device separate from a smartphone) display (e.g., alternate display 1305 of example smartwatch 1319, shown in the subsequent figure), which may be connected with and able to engage in communications with smartphone 1201, in some embodiments.

As mentioned above, with respect to some example embodiments of processes which may be carried out with specialized control systems, such as any of the control systems set forth in this application running software as described in this application, a control system within a smartphone case peripheral device, or an example smartphone, such as smartphone 1201, may carry out certain procedural steps related to monitoring and gathering data related to a user's behavior, physical characteristics, and/or abilities, in accordance with aspects of the present invention. And, in some of those embodiments, a separate control system, other than a main control system of the smartphone 1201, may so carry out such procedural steps, retaining certain private data, while sharing other data with other control systems and third parties, in accordance with a user's preferences. For example, as set forth above, in reference to the process flow diagram of FIG. 5, in some embodiments, a user may record data related to her or his physical capabilities and, in some particular embodiments, data related to her or his grip strength. FIG. 12 provides one example of a GUI—namely, user interface 1200—aiding the control system and user in carrying some of such procedural steps, and gathering and handling such data.

First, as noted in example process flow steps 515 et. seq., discussed above, such a smartphone or smartphone case peripheral device may maintain a schedule of "squeeze reminders," leading to GUI aspects prompting a user to test her or his grip strength by applying force to sensors within or about a case or housing of smartphone 1201 (or, in some embodiments, a smartphone case peripheral device), which may then record data related to pressure measures from the sensors, and other data related to a user's grip strength. Accordingly, in an example of such an embodiment, haptic feedback may be provided periodically as, or as part of, such a "squeeze reminder," to so prompt a user, requesting that the user engage in such a grip strength test. For example, in some embodiments, the smartphone may begin to buzz or shake, as shown by example haptic feedback vibration-indicating lines 1205, in order to so prompt the user. Such buzzing and/or shaking may be caused by actuators under the control of the control system within smartphone 1201, in some embodiments. In some embodiments, such buzzing and/or shaking may be carried out in a unique pattern or other type of such buzzing and/or shaking, to uniquely identify the prompt as relating to such a squeeze reminder, as opposed to other patterns or types of such buzzing and/or shaking associated with other smartphone alerts.

In some embodiments, a visual GUI such as example user interface 1200 provides such a prompt and/or squeeze reminder, instead of, in addition to, and/or supplementing such haptic feedback, among other possible functions for such a GUI. In some such embodiments, a visual message 1207 may command the user to begin squeezing the smartphone and/or smartphone case peripheral device, which will then begin recording pressure readings on exterior sensors resulting from such squeezing. In some embodiments, a planned duration of the grip strength test may also be indicated, via a test duration indicator 1209. In some embodiments, visual progress indicators, such as example squeeze pressure indicating bent lines 1213, may also or alternatively be provided within user interface 1200, and may provide the user with feedback regarding various aspects of such a test, once underway. The function of such visual progress indicators will be discussed in greater detail below.

Figure 13:
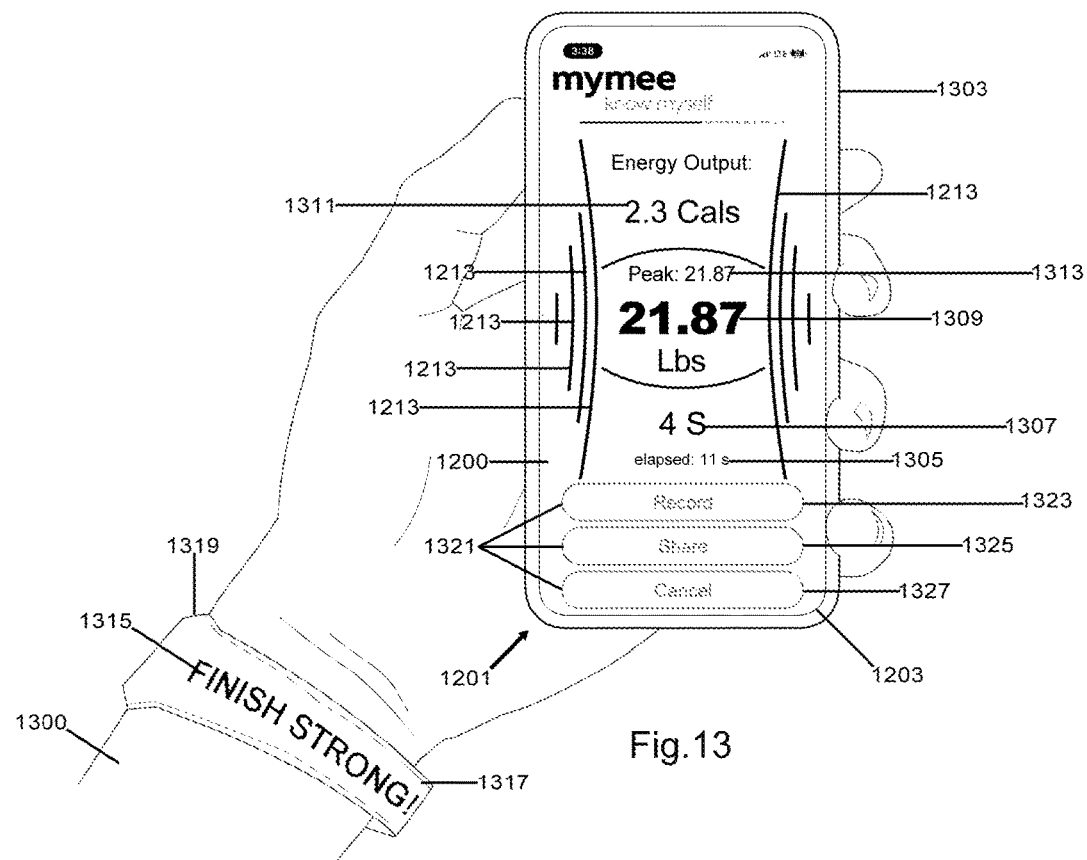
FIG. 13 is a front view of the example user interface and smartphone depicted in FIG. 12, implementing some additional exemplary aspects of the embodiments during a data generating activity.

FIG. 13 is a front view of another form of the example user interface 1200, and the example smartphone 1201 presenting it, as depicted above, in FIG. 12, at a later point in time, and implementing some additional example aspects of the present invention during a data generating activity. At the point in time depicted, a user 1300 has responded to a squeeze reminder, as discussed above, by picking up smartphone 1201 and beginning to exert substantial inward (i.e. "squeezing") pressure against sensors on or about protective case 1303 of smartphone 1201, which triggers the beginning of a grip strength test as discussed in this application. In some embodiments, protective case 1303 may be fortified with additional support, in comparison to other smartphones of a similar form, to prevent any ordinary range of human grip strength exerted against protective case 1303 from damaging smartphone 1201. In some such embodiments, an additional amount of structural reinforcement against squeezing forces may be provided, to ensure a margin of safety, above and beyond an ordinary range of human grip strength. For example, as discussed above for certain smartphone case peripheral devices, in some embodiments, an internal support structure, including a rigid material suitable for protecting, preventing and/or reducing the compression of smartphone 1201 when a user presses on its housing, may be provided within protective case 1303.

As also mentioned above, visual progress indicators may be included in some embodiments of user interface 1200 (and other embodiments of user interfaces in accordance with the present invention). Such visual progress indicators may relate to any type and amount of data related to the grip strength test, any aspect of the grip strength test, and/or the user in various embodiments. For example, in some embodiments, as user 1300 begins the grip strength test, as pictured, a timer within the control system may begin to track the amount of time that has elapsed, which is reported to the user via a time elapsed indicator 1305, and the amount of time that remains of the planned duration (for the test) is reported via a time remaining indicator 1307.

As another example, as also as discussed above, squeeze pressure indicating bent lines 1213 may indicate a visual perception of the progress of one aspect of the grip strength test, rather than, or in addition to, written words or numbers—namely, the grip strength pressure currently being applied causes squeeze pressure indicating bent lines 1213 to progress inward on front touchscreen 1203. In some embodiments, squeeze pressure indicating bent lines 1213 may also, or alternatively, become more numerous and/or larger, to illustrate such increasing grip strength pressure, also as pictured.

In some embodiments, the grip strength pressure may also or alternatively be illustrated by a numerical grip strength pressure indicator 1309. Although numerical grip strength pressure indicator 1309 is shown as displaying pressure units in pounds, it should be understood that any suitable unit or form demonstrating the relative strength of a user's grip may, alternatively or in addition, be used (e.g., kilograms, pounds-per-square-inch). In some embodiments, the total amount of energy consumed by the user's muscles in carrying out the grip strength test (e.g., in exerting the squeezing pressure during the test, sensed by smartphone 1201) may also be recorded and reported to the user in real time, via an energy consumption indicator 1311 (e.g., in Calories, as pictured). Of course, any other suitable type of data may likewise be reported to the user in real time during the hand grip strength test, in some embodiments of the invention, in addition to, or as an alternative to, the examples provided in reference to FIG. 13. For example, in some embodiments, implementing movable members of a smartphone case peripheral device (as discussed in this application) an amount of work, or rate of work (power) may be so reported to the user, and recorded as data related to hand grip strength generated during the hand grip test. In some embodiments, such work and rate of work measurements may be estimated, even in instances without such moving members of a smartphone case peripheral device, based on an amount of bone movement during hand or finger compression. In any event, in some embodiments, a user may be provided with a peak indicator 1313 that indicates a highest amount of pressure (or other measure of grip strength) achieved at any point during the hand grip strength test.

In some embodiments, a user also may be provided with a GUI element encouraging her or him to increase her or his muscular exertion (e.g., to a maximum) when such a peak amount of pressure is recorded and/or when the duration of the grip strength test is reaching an end (e.g., during the final 3 seconds, or final 5 seconds, in some embodiments) as shown with example coaching feedback element 1315, shown on auxiliary display 1317 of smartwatch 1319 (which, as discussed above, may be part of, or may be controlled by, the control system, in some embodiments).

Upon the conclusion of the hand grip strength test (e.g., at the end of that duration) a user may then choose to save, discard and/or designate the data recorded by the control system related to that test (e.g., the peak hand grip pressure) as private or share it with third persons—e.g., using any of the selectable privacy designation GUI options pictured as 1321. For example, by selecting the example "Record" option GUI element 1323, a user may choose to record such data within the private, segregated control system, where it is not accessible to other control systems with lower data security, such as a main control system of the smartphone, thus designating that data as private and not for sharing. Alternatively, in some embodiments, by selecting example "Share" option GUI element 1325, a user may instead choose to so make the data from the test accessible to such other control systems and/or third parties. In some embodiments, a user may elect to delete such data from such a test altogether, at least, with respect to some tests, by selecting example "Cancel" GUI element 1327. In some embodiments, a user may then be permitted to attempt a similar test, afterwards, following the same steps discussed above.

As mentioned above, a wide variety of alternative embodiments of the present invention will be apparent to those of skill in the art(s) relevant to the invention. For example, any aspect of the invention set forth above may be combined with any other aspect, in different numbers, combinations, orders and configurations, in various innumerable embodiments. Any such embodiments, among others, fall within the scope of the invention, and the recitation of any particular embodiments is for illustrative purposes, and does not limit the scope of the invention.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring, in all embodiments, that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

It should be noted that some of the disclosures set forth as background, such as, but not limited to, the above language under the heading "Background," do not relate exclusively to prior art and the state of the art in the field(s) of the invention, and should not be construed as an admission with respect thereto.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A smartphone case peripheral device comprising:
   a housing comprising:
      at least one exterior surface(s); and
      a smartphone-receiving section configured to receive a smartphone therein;
   at least one pressure sensor(s) located on or about said housing, the at least one pressure sensor(s) configured to:
      sense pressure applied in an inward direction, toward an interior part of said housing, and on or about said at least one pressure sensor(s) caused by a human hand; and
      monitor an amount and/or a rate of said inward pressure;
   at least one member(s), configured to move relative to the housing, operatively connected to the at least one pressure sensor(s), wherein the at least one pressure sensor(s) is/are configured to sense pressure based on movement of the at least one member(s);
   a communications device configured to provide a communications connection between the smartphone case peripheral device and a smartphone held by the smartphone-receiving section; and
   specialized computer hardware and software in communication with the at least one pressure sensor(s) and the communications device.

2. A smartphone case peripheral device according to claim 1, wherein
   the at least one member(s) are at least partially exposed and extending from the housing.

3. A smartphone case peripheral device according to claim 2, wherein the at least one member(s) comprises at least one shock-absorbing bumper(s).

4. A smartphone case peripheral device according to claim 2, wherein the at least one member(s) comprises at least one compressible hand grip(s).

5. A smartphone case peripheral device according to claim 4, wherein the at least one member(s) comprises at least one shock-absorbing bumper(s).

6. A smartphone case peripheral device according to claim 5, wherein:
   the at least one shock-absorbing bumper(s) extends a first distance outward from at least one of the at least one exterior surface(s);
   the at least one compressible hand grip(s) extends a second distance outward from the at least one of the at least one exterior surface(s); and
   the first distance is greater than the second distance.

7. A smartphone case peripheral device according to claim 2, further comprising:
   at least one force transmission strut(s) operatively connected to the at least one member(s),
   wherein the at least one member(s) is configured to drive the at least one force transmission strut(s).

8. A smartphone case peripheral device according to claim 7, wherein at least one of the at least one force transmission strut(s) is configured to drive at least one shock absorber(s).

9. A smartphone case peripheral device according to claim 2, wherein the specialized computer hardware and software is configured to apply an outward-directed force to at least one of the at least one member(s).

10. A smartphone case peripheral device according to claim 1, wherein the specialized computer hardware and software is configured to transmit a reminder to a user to perform a periodic handgrip strength test.

11. A smartphone case peripheral device according to claim 10, wherein the specialized computer hardware and software is configured to transmit the reminder via a specialized feedback pattern that is used exclusively to identify the reminder to a user.

12. A peripheral device for a smartphone comprising:
    an outer housing;
    specialized computer hardware and software configured to monitor behavior of a user of a smartphone, the specialized computer hardware comprising at least one smartphone actuation sensor(s) comprised in a flat, at least partially transparent auxiliary touchscreen, overlaid onto a touchscreen of the smartphone; and
    a communications connection device configured to provide a communications connection between the peripheral device and the smartphone,
    wherein said specialized computer hardware and software and said at least one smartphone actuation sensor are each configured to monitor and record data related to touch actuation of said smartphone, and
    wherein said specialized computer hardware is configured to classify at least some of said data as private or non-private, and to treat said data classified as private or non-private differently.

13. A peripheral device for a smartphone according to claim 12, wherein the at least partially transparent auxiliary touchscreen comprises a matrix of actuators.

14. A peripheral device for a smartphone according to claim 13, wherein the at least partially transparent auxiliary touchscreen comprises a touch transmission medium configured to permit a user to actuate said touchscreen of the smartphone through said at least partially transparent auxiliary touchscreen.

15. A peripheral device for a smartphone according to claim 14, wherein the matrix of actuators is configured to modify touch actuation of said touchscreen of said smartphone.

16. A peripheral device for a smartphone according to claim 12, wherein the at least partially transparent auxiliary touchscreen is configured to add dynamic visual augmentations to the touchscreen of the smartphone.

17. A peripheral device for a smartphone according to claim 16, wherein said visual augmentations comprise graphical user interface ("GUI") elements.

18. A peripheral device for a smartphone according to claim 17, wherein said GUI elements comprise instructions for a user performing a manual strength, agility and/or dexterity test.

19. A peripheral device for a smartphone according to claim 18, wherein said GUI elements comprise a measure of manual strength, agility and/or dexterity of a user.

20. A peripheral device for a smartphone according to claim 19, wherein said measure comprises a peak reading.

* * * * *